(12) United States Patent
Zhao et al.

(10) Patent No.: US 12,445,229 B2
(45) Date of Patent: Oct. 14, 2025

(54) HARQ PROCESS BASED DATA TRANSMISSION METHOD AND TERMINAL

(71) Applicant: Huawei Technologies Co., Ltd., Shenzhen (CN)

(72) Inventors: Li Zhao, Shenzhen (CN); Chunhua You, Shanghai (CN); Chong Lou, Shanghai (CN); Yinghao Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 330 days.

(21) Appl. No.: 17/990,213

(22) Filed: Nov. 18, 2022

(65) Prior Publication Data

US 2023/0081816 A1    Mar. 16, 2023

Related U.S. Application Data

(63) Continuation of application No. PCT/CN2021/094719, filed on May 19, 2021.

(30) Foreign Application Priority Data

May 20, 2020    (CN) .......................... 202010432833.0

(51) Int. Cl.
*H04L 1/1829*    (2023.01)
*H04L 1/1812*    (2023.01)
(Continued)

(52) U.S. Cl.
CPC .......... *H04L 1/1861* (2013.01); *H04L 1/1822* (2013.01); *H04W 72/044* (2013.01);
(Continued)

(58) Field of Classification Search
CPC ... H04L 1/1861; H04L 1/1822; H04L 1/1812; H04L 1/1864; H04L 1/1883;
(Continued)

(56) References Cited

U.S. PATENT DOCUMENTS

| 11,553,417 B2 | 1/2023 | Lee et al. |
| 2019/0132824 A1 | 5/2019 | Jeon et al. |

(Continued)

FOREIGN PATENT DOCUMENTS

| CN | 109792792 A | 5/2019 |
| CN | 110557835 A | 12/2019 |

(Continued)

OTHER PUBLICATIONS

Ericsson, "Discussions on configured grant in NR-U", 3GPP Draft; R2-1913501, Oct. 3, 2019, 10 pages.

(Continued)

*Primary Examiner* — Michael A Keller
*Assistant Examiner* — Thao D Duong
(74) *Attorney, Agent, or Firm* — Slater Matsil, LLP

(57) ABSTRACT

Embodiments of this application provide a HARQ process-based data transmission method and a terminal, and relate to communication technologies, to determine an initial status of a HARQ process and further perform uplink transmission by using a HARQ process that is in a not pending status. A specific solution includes: A terminal sets one or more HARQ processes that are associated with a first configured grant CG configuration on a first bandwidth part BWP to be in a not pending status, where the first CG configuration includes one or more CG configurations configured by a network device for the terminal on the first BWP, and the first BWP is a currently activated BWP of the terminal; and the terminal sends uplink data to the network device by using the HARQ process that is associated with the first CG configuration and that is in the not pending status.

20 Claims, 9 Drawing Sheets

(51) Int. Cl.
*H04L 1/1822* (2023.01)
*H04W 72/044* (2023.01)
*H04W 72/23* (2023.01)
*H04W 74/0808* (2024.01)

(52) U.S. Cl.
CPC ....... *H04W 74/0808* (2013.01); *H04L 1/1812* (2013.01); *H04W 72/23* (2023.01)

(58) Field of Classification Search
CPC ............ H04L 1/1896; H04W 72/044; H04W 74/0808; H04W 72/23; H04W 72/0453; H04W 76/27
See application file for complete search history.

(56) References Cited

U.S. PATENT DOCUMENTS

| | | | |
|---|---|---|---|
| 2020/0100170 A1 | 3/2020 | Babaei et al. | |
| 2020/0137821 A1 | 4/2020 | Cirik et al. | |
| 2021/0051701 A1* | 2/2021 | Fakoorian | H04W 72/23 |
| 2022/0077963 A1* | 3/2022 | Salim | H04L 1/1825 |
| 2022/0116988 A1* | 4/2022 | Shi | H04L 1/1887 |
| 2022/0158765 A1* | 5/2022 | Lu | H04L 1/1883 |
| 2022/0173844 A1* | 6/2022 | Lee | H04L 1/188 |
| 2022/0232596 A1* | 7/2022 | Lu | H04W 76/28 |

FOREIGN PATENT DOCUMENTS

| | | |
|---|---|---|
| EP | 3478019 A1 | 5/2019 |
| WO | 2019245219 A1 | 12/2019 |

OTHER PUBLICATIONS

Nokia et al., "Multiple configured grants per BWP for NR-U", 3GPP Draft; R2-1913289, Oct. 3, 2019, 2 pages.

LG Electronics Inc., "Consideration of delayed CG confirmation", 3GPP TSG-RAN WG2 Meeting #109 electronic, Elbonia, Feb. 24-Mar. 6, 2020, R2-2001442, 3 pages.

"3rd Generation Partnership Project; Technical Specification Group Radio Access Network; Evolved Universal Terrestrial Radio Access (E-UTRA) ; Radio Resource Control (RRC); Protocol specification (Release 16)," 3GPP TS 36.331 V16.0.0, Mar. 2020, 1048 pages.

"3rd Generation Partnership Project; Technical Specification Group Radio Access Network; NR; NR and NG-RAN Overall Description; Stage 2 (Release 16)," 3GPP TS 38.300 V16.1.0, Mar. 2020, 133 pages.

"3rd Generation Partnership Project; Technical Specification Group Radio Access Network; NR; Medium Access Control (MAC) protocol specification (Release 16)," 3GPP TS 38.321 V16.0.0, Mar. 2020, 141 pages.

"3rd Generation Partnership Project; Technical Specification Group Radio Access Network; NR; Radio Resource Control (RRC) protocol specification (Release 16)," 3GPP TS 38.331 V16.0.0, Mar. 2020, 835 pages.

"MPDCCH Monitoring for Receiving HARQ ACK Feedback," Source to WG: Nokia, Nokia Shanghai Bell, Source to TSG: R2, Work item code: LTE_eMTC4-Core, Date: Nov. 1, 2018, Category: F, Release: Rel-15, Change Request, 36.321, CR 1359, rev 4, Current version: 15.3.0, 3GPP TSG-RAN WG2 Meeting #104, R2-1817041, Spokane, USA, Nov. 12-16, 2018, 6 pages.

* cited by examiner

HARQ PROCESS BASED DATA TRANSMISSION METHOD AND TERMINAL

CROSS-REFERENCE TO RELATED APPLICATIONS

This application is a continuation of International Application No. PCT/CN2021/094719, filed on May 19, 2021, which claims priority to Chinese Patent Application No. 202010432833.0, filed on May 20, 2020. The disclosures of the aforementioned applications are hereby incorporated by reference in their entireties.

TECHNICAL FIELD

This application relates to the field of communication technologies, and in particular, to a hybrid automatic repeat request (HARQ) process-based data transmission method and a terminal.

BACKGROUND

In a new radio (NR)-based access to unlicensed spectrum (NR-U) technology, a terminal supports a plurality of configured grant configurations (CG configurations) on one activated bandwidth part (BWP). The CG configuration represents a resource required for uplink transmission (that is, uplink data transmission) preconfigured by a network device for the terminal, and the plurality of CG configurations may share a HARQ process.

The terminal starts to send uplink data by using a HARQ process that is associated with a CG configuration, and starts a configured grant timer (CGT) and a configured grant retransmission timer (CGRT) when the uplink data is successfully sent by using a listen before talk (LBT) mechanism. The CGT is used to limit total duration of a process of transmitting one piece of uplink data, and the CGRT is used to limit a transmission interval between retransmissions in the process of transmitting one piece of uplink data. The process of transmitting one piece of uplink data includes new transmission and retransmission for the same piece of uplink data. The new transmission refers to sending the uplink data for the first time. The retransmission means that the uplink data is sent each time after the new transmission fails. Both the CGT and the CGRT start timing when the uplink data is successfully transmitted during the new transmission. When timing duration of the CGRT is equal to a retransmission duration threshold, or when the terminal receives a negative acknowledgment (NACK) feedback, if it is determined that the CGT is still performing timing, the terminal performs automatic retransmission on the CG configuration by using the HARQ process. Similarly, when the terminal performs the retransmission on the CG configuration by using the HARQ process, the CGRT is started when the uplink data is successfully sent by using the LBT mechanism. When timing duration of the CGT is equal to a transmission duration threshold, or when the terminal receives an acknowledgment (ACK) feedback, the CGT is stopped. In this case, the terminal may transmit other uplink data by using the HARQ process.

It can be learned that, in the foregoing technology, if the uplink data fails to be transmitted because an LBT failure occurs when the terminal performs the new transmission by using the HARQ process, the CGT and the CGRT are not started, and the uplink data is continuously stored in a buffer (HARQ buffer) of the HARQ process. Because the CGT is not running, the terminal may use the HARQ process to newly transmit a next piece of uplink data, and the next piece of uplink data overwrites the uplink data in the HARQ buffer. In this case, a media access control (MAC) layer does not send the uplink data to the network device, and does not send the uplink data any more. In other words, the uplink data can be retransmitted only by relying on a higher layer.

To resolve this problem, a pending status of the HARQ process is introduced into an NR-U system. For the new transmission and the retransmission, when the uplink data is successfully sent by using the HARQ process, the terminal determines that the HARQ process is in a not pending status. When the uplink data is not successfully sent by using the HARQ process, the terminal determines that the HARQ process is in a pending status. In addition, after the HARQ process is in the pending status, the pending status of the HARQ process is canceled only when the uplink data is successfully sent or when the buffer of the HARQ process is cleared. In this case, to avoid discarding of the uplink data, the terminal uses the HARQ process to newly transmit the next piece of uplink data after determining that the CGRT and the CGT stop timing, and after determining that the HARQ process is in the not pending status.

However, when the HARQ process is initially used, the terminal does not know a status of the HARQ process, and cannot use the HARQ process for the new transmission. In other words, there is a lack of an initial status of the HARQ process (that is, the not pending status), and consequently, the HARQ process cannot be used for the new transmission.

SUMMARY

Embodiments of this application provide a HARQ process-based data transmission method and a terminal, to determine an initial status of a HARQ process and further perform new transmission by using a HARQ process that is in a not pending status.

According to a first aspect, an embodiment of this application provides a HARQ process-based data transmission method. A terminal may set one or more HARQ processes that are associated with a first CG configuration on a first bandwidth part BWP to be in a not pending status. The first CG configuration may include one or more CG configurations configured by a network device for the terminal on the first BWP. The first BWP is a currently activated BWP of the terminal. The terminal may send uplink data to the network device by using the HARQ process that is associated with the first CG configuration and that is in the not pending status.

According to this solution, for the first CG configuration configured by the network device for the terminal on the first BWP, the terminal may set the one or more HARQ processes that are associated with the first CG configuration to be in the not pending status. In this way, an initial status (that is, the not pending status) of the one or more HARQ processes is set. If the one or more HARQ processes are in the not pending status, it indicates that the one or more HARQ processes can be used for new transmission. Therefore, the terminal may perform the new transmission by using one of the one or more HARQ processes. In this way, the terminal may perform the new transmission by using a HARQ process whose initial status is the not pending status.

Specifically, when receiving first signaling related to a CG configuration, the terminal may set the one or more HARQ processes that are associated with the first CG configuration to be in the not pending status. A CG configuration indicated by the first signaling is the first CG configuration, and the first signaling may include radio resource control (RRC)

signaling and a downlink control information (DCI) activation command. The RRC signaling is used to configure and activate the CG configuration for the terminal. The RRC signaling may be further used to only configure the CG configuration for the terminal. The DCI activation command is used to activate (initially activate or reactivate) a CG configuration that has already been configured for the terminal.

Correspondingly, the first CG configuration may include all CG configurations configured by the network device for the terminal via the RRC signaling, and all the configured CG configurations may include activated CG configurations and inactivated CG configurations. The first CG configuration may further include a CG configuration that is configured and activated by the network device for the terminal by using the RRC. The first CG configuration may further include a configured CG configuration that the network device activates (initially activates or reactivates) for the terminal by using the DCI activation command.

In other words, in this embodiment of this application, after receiving the first signaling from the network device, the terminal may determine the first CG configuration based on the first signaling, and then set the one or more HARQ processes that are associated with the first CG configuration.

In a possible design manner of the first aspect, the terminal may receive the DCI activation command from the network device, where the DCI activation command indicates the terminal to activate (initially activate or reactivate) a CG configuration, and the activated (initially activated or reactivated) CG configuration is the first CG configuration. In response to receiving the DCI activation command, the terminal may set the one or more HARQ processes to be in the not pending status. Specifically, that the terminal sets the one or more HARQ processes that are associated with the first CG configuration on the first BWP to be in the not pending status includes: In response to receiving the DCI activation command from the network device, the terminal sets the one or more HARQ processes that are associated with the first CG configuration to be in the not pending status.

It may be understood that the terminal activates the first CG configuration in response to the DCI activation command, and the activated first CG configuration may be directly used. Sending the uplink data by using the available first CG configuration is specifically sending the uplink data by using a HARQ process that is associated with the first CG configuration. To enable the terminal to determine the initial statuses of the HARQ processes that are associated with the currently available first CG configuration, in response to the DCI activation command, the terminal may further set the one or more HARQ processes that are associated with the first CG configuration that the DCI activation command indicates to activate to be in the not pending status.

In another possible design manner of the first aspect, the terminal may receive the RRC signaling from the network device. The RRC signaling may be used to configure and activate the first CG configuration for the terminal, or may be used to only configure the first CG configuration for the terminal (that is, configure but not activate the first CG configuration). In response to receiving the RRC signaling, the terminal may set the one or more HARQ processes to be in the not pending status. Specifically, that the terminal sets the one or more HARQ processes that are associated with the first CG configuration on the first BWP to be in the not pending status includes: In response to receiving the RRC signaling from the network device, the terminal sets the one or more HARQ processes that are associated with the first CG configuration to be in the not pending status.

It may be understood that, in response to different RRC signaling, the terminal configures and activates the first CG configuration on the currently activated first BWP, or only configures the first CG configuration. Both the configured and activated first CG configuration and the only configured first CG configuration may be used to send the uplink data. Sending the uplink data by using the available first CG configuration is specifically sending the uplink data by using a HARQ process that is associated with the first CG configuration. To enable the terminal to determine the initial statuses of the HARQ processes that are associated with the currently available first CG configuration, in response to the RRC signaling, the terminal may further set the one or more HARQ processes that are associated with the available first CG configuration to be in the not pending status.

In another possible design manner of the first aspect, the one or more HARQ processes that are associated with the first CG configuration may include all HARQ processes that are associated with the first CG configuration. In other words, the terminal may set all the HARQ processes that are associated with the first CG configuration to be in the not pending status.

In another possible design manner of the first aspect, the one or more HARQ processes that are associated with the first CG configuration may include a part of HARQ processes that are associated with the first CG configuration.

Specifically, the one or more HARQ processes that are associated with the first CG configuration may include: a HARQ process that is one of the HARQ processes that are associated with the first CG configuration and that is in a pending status, a first HARQ process that is one of the HARQ processes that are associated with the first CG configuration, a HARQ process that is one of the HARQ processes that are associated with the first CG configuration and that is not being used, or a corresponding HARQ process that is one of the HARQ processes that are associated with the first CG configuration.

No uplink grant that is associated with the first HARQ process exists in uplink grant currently delivered to a HARQ entity, and that no uplink grant that is associated with the first HARQ process exists in uplink grant currently delivered to a HARQ entity indicates that the first HARQ process has not been used by the terminal. The foregoing corresponding HARQ process is a HARQ process randomly selected by the terminal.

In another possible design manner of the first aspect, if determining that N consecutive uplink LBT failures occur on the first BWP, the terminal may clear buffers of all HARQ processes that are associated with a second CG configuration on the first BWP, or may set all HARQ processes that are associated with a second CG configuration on the first BWP to be in the not pending status.

N≥2, and N is a positive integer. The second GG configuration includes all CG configurations configured by the network device for the terminal on the first BWP, or an activated CG configuration for the terminal on the first BWP. The second CG configuration may be the same as the first CG configuration, or may be different from the first CG configuration. After the buffers of all the HARQ processes that are associated with the second GG configuration are cleared, all the HARQ processes that are associated with the second GG configuration are in the not pending status.

It may be understood that after determining that the N consecutive uplink LBT failures occur on the first BWP, the terminal may switch from the first BWP to another BWP.

Any one or more HARQ processes that are associated with the second CG configuration (namely, all the CG configurations configured by the network device for the terminal on the first BWP or the activated CG configuration for the terminal on the first BWP) on the first BWP may be in the pending status due to a failure in sending the uplink data. In addition, a CG configuration on the another BWP that is switched to may also be associated with the any one or more HARQ processes that are in the pending status due to the failure in sending the uplink data.

If the any one or more HARQ processes are still in the pending status, the CG configuration on the another BWP that is switched to cannot use the any one or more HARQ processes for the new transmission. To avoid this, in this application, after determining that the N consecutive uplink LBT failures occur on the first BWP, the terminal may set the any one or more HARQ processes that are associated with the second CG configuration on the first BWP to be in the not pending status, so that the any one or more HARQ processes can be reused for the new transmission on the another BWP that is switched to.

In this design manner, after receiving an instruction that is sent by the network device and that indicates to activate the first BWP, the terminal starts to count a total quantity of uplink LBT failures that occur on the first BWP. The total quantity of uplink LBT failures that occur on the first BWP may include a quantity of uplink LBT failures that occur on all uplink transmission (namely, a process of transmitting all the uplink data) on the first BWP. If the total quantity is equal to N, the terminal determines that the N consecutive uplink LBT failures occur on the first BWP, triggers a status of consecutive uplink LBT failures, and clears the buffers of the HARQ processes that are associated with the second CG configuration on the first BWP, or sets the HARQ processes that are associated with the second CG configuration on the first BWP to be in the not pending status.

In another possible design manner of the first aspect, after determining that the N consecutive uplink LBT failures occur on the first BWP, the terminal triggers the status of consecutive uplink LBT failures. When sending a media access control control element (MAC CE) to the network device, the terminal clears the buffers of the HARQ processes that are associated with the second CG configuration on the first BWP, or sets the HARQ processes that are associated with the second CG configuration on the first BWP to be in the not pending status. The MAC CE includes an LBT failure status indicator bit of a serving cell in which the terminal is located. This design manner provides a possible occasion for the terminal to perform "clearing the buffers of all the HARQ processes that are associated with the second CG configuration, or setting all the HARQ processes that are associated with the second CG configuration to be in the not pending status"

In another possible design manner of the first aspect, when the terminal is located in a primary cell or a primary secondary cell and actively switches from the first BWP to a second BWP, the terminal may clear the buffers of all the HARQ processes that are associated with the second CG configuration, or set all the HARQ processes that are associated with the second CG configuration to be in the not pending status. The second BWP is a BWP that is configured with a physical random access channel (PRACH) resource and on which the N consecutive uplink LBT failures do not occur, and the second BWP and the first BWP belong to a same serving cell. "The N consecutive uplink LBT failures do not occur" may be "no consecutive N uplink LBT failures occur until a current moment". This design manner provides a possible occasion for the terminal to perform "clearing the buffers of all the HARQ processes that are associated with the second CG configuration, or setting all the HARQ processes that are associated with the second CG configuration to be in the not pending status"

In another possible design manner of the first aspect, the terminal may receive a BWP switching instruction from the network device, and in response to the BWP switching instruction, the terminal may clear the buffers of all the HARQ processes that are associated with the second CG configuration, or set all the HARQ processes that are associated with the second CG configuration to be in the not pending status. This design manner provides a possible occasion for the terminal to perform "clearing the buffers of all the HARQ processes that are associated with the second CG configuration, or setting all the HARQ processes that are associated with the second CG configuration to be in the not pending status"

In another possible design manner of the first aspect, the terminal determines each time that the HARQ process that is used to send the uplink data is used for new transmission or retransmission, and determines whether the HARQ process that is used to send the uplink data is in the pending status. If the HARQ process that is used to send the uplink data is in the pending status, a quantity of pending times recorded by a pending counter is increased by 1, where an initial value of the quantity of pending times recorded by the pending counter is zero. If the quantity of pending times recorded by the pending counter is equal to a preset quantity-of-times threshold, the terminal clears a buffer of the HARQ process that is used to send the uplink data, or sets the HARQ process that is used to send the uplink data to be in the not pending status. After the buffer of the HARQ process that is used to send the uplink data is cleared, the HARQ process that is used to send the uplink data is in the not pending status.

In this design manner, each time the terminal determines that the HARQ process that is used to send the uplink data is used for the new transmission or the retransmission, the terminal may determine whether the HARQ process that is used to send the uplink data is in the pending status or the not pending status. If the HARQ process is in the pending status, the quantity of pending times recorded by the pending counter is increased by 1; or if the HARQ process is in the not pending status, the quantity of pending times recorded by the pending counter is not increased by 1.

It may be understood that the quantity of pending times recorded by the pending counter indicates a total quantity of times that the HARQ process that is used to send the uplink data changes to the pending status in a process of transmitting the uplink data. If the total quantity of times is equal to the preset quantity-of-times threshold, the HARQ process that is used to send the uplink data is enabled to be in the not pending status (that is, clear the buffer of the HARQ process that is used to send the uplink data or set the HARQ process that is used to send the uplink data to be in the not pending status). In other words, the HARQ process that is used to send the uplink data may be used to newly transmit other uplink data. In this way, a problem that when the HARQ process that is used to send the uplink data fails to send the uplink data for a plurality of times, the HARQ process that is used to send the uplink data is in the pending status for a long time, that is, is occupied for a long time, is resolved.

In another possible design manner of the first aspect, the terminal determines each time that the HARQ process that is used to send the uplink data is used for the new transmission or the retransmission, and determines whether the HARQ process that is used to send the uplink data is in the pending status or the not pending status. If it is determined that the HARQ process that is used to send the uplink data is in the pending status and a pending timer is not started, start the pending timer. If it is determined that the HARQ process that is used to send the uplink data is in the not pending status and the pending timer is running, stop the pending timer. If timing duration of the pending timer is equal to a preset duration threshold, the terminal clears the buffer of the HARQ process that is used to send the uplink data, or sets the HARQ process that is used to send the uplink data to be in the not pending status. The pending timer is used to count total duration during which the HARQ process that is used to send the uplink data is in the pending status in the process of transmitting the uplink data. After the buffer of the HARQ process that is used to send the uplink data is cleared, the HARQ process that is used to send the uplink data is in the not pending status.

In this design manner, each time when the HARQ process that is used to send the uplink data is used for the new transmission or the retransmission, the terminal may determine whether the HARQ process that is used to send the uplink data is in the pending status or the not pending status. If the HARQ process is in the pending status, start the pending timer when the pending timer is not started, or continue to run a running pending timer. If the HARQ process is in the not pending status, do not start the pending timer when the pending timer is not started, or stop the pending timer when the pending timer is running.

It may be understood that the pending timer is used to count the total duration during which the HARQ process that is used to send the uplink data is continuously in the pending status in the process of transmitting the uplink data. In this case, timing duration obtained by the terminal by using the pending timer is the total duration during which the HARQ process that is used to send the uplink data is continuously in the pending status in the process of transmitting the uplink data. If the total duration is equal to the preset duration threshold, the HARQ process that is used to send the uplink data is enabled to be in the not pending status (that is, clear the buffer of the HARQ process that is used to send the uplink data and set the HARQ process that is used to send the uplink data to be in the not pending status). In other words, the HARQ process that is used to send the uplink data may be used to newly transmit other uplink data. In this way, a problem that when the HARQ process that is used to send the uplink data consecutively fails to send the uplink data for a plurality of times, the HARQ process that is used to send the uplink data is in the pending status for a long time, that is, is occupied for a long time, is resolved.

According to a second aspect, an embodiment of this application provides a terminal. The terminal includes a status setting unit and a data sending unit. The status setting unit is configured to set one or more HARQ processes that are associated with a first CG configuration on a first BWP to be in a not pending status. The first CG configuration includes one or more CG configurations configured by a network device for the terminal on the first BWP, and the first BWP is a currently activated BWP of the terminal. The data sending unit is configured to send uplink data to the network device by using the HARQ process that is associated with the first CG configuration and that is in the not pending status.

In a possible design manner of the second aspect, the status setting unit is specifically configured to: in response to receiving a DCI activation command from the network device, set the one or more HARQ processes that are associated with the first CG configuration to be in the not pending status. The DCI activation command indicates the terminal to activate the first CG configuration.

In another possible design manner of the second aspect, the status setting unit is specifically configured to: in response to receiving RRC signaling from the network device, set the one or more HARQ processes that are associated with the first CG configuration to be in the not pending status. The RRC signaling is used to configure and activate the first CG configuration for the terminal, or is used to only configure the first CG configuration for the terminal.

In another possible design manner of the second aspect, the one or more HARQ processes that are associated with the first CG configuration include: all HARQ processes that are associated with the first CG configuration, a HARQ process that is one of the HARQ processes that are associated with the first CG configuration and that is in a pending status, a first HARQ process that is one of the HARQ processes that are associated with the first CG configuration, a HARQ process that is one of the HARQ processes that are associated with the first CG configuration and that is not being used, or a corresponding HARQ process that is one of the HARQ processes that are associated with the first CG configuration. No uplink grant that is associated with the first HARQ process exists in uplink grant currently delivered to a HARQ entity, and that no uplink grant that is associated with the first HARQ process exists in uplink grant currently delivered to a HARQ entity indicates that the first HARQ process has not been used by the terminal. The corresponding HARQ process is a HARQ process randomly selected by the terminal.

In another possible design manner of the second aspect, the status setting unit is further configured to: if determining that N consecutive uplink LBT failures occur on the first BWP, clear buffers of all HARQ processes that are associated with a second CG configuration on the first BWP, or set all HARQ processes that are associated with a second CG configuration on the first BWP to be in the not pending status. N≥2, and N is a positive integer. The second GG configuration includes all CG configurations configured by the network device for the terminal on the first BWP, or an activated CG configuration for the terminal on the first BWP. After the buffers of all the HARQ processes that are associated with the second CG configuration are cleared, all the HARQ processes that are associated with the second GG configuration are in the not pending status.

In another possible design manner of the second aspect, the status setting unit is specifically configured to: when sending a MAC CE to the network device, clear the buffers of all the HARQ processes that are associated with the second CG configuration on the first BWP, or set all the HARQ processes that are associated with the second CG configuration on the first BWP to be in the not pending status. The MAC CE includes an LBT failure status indicator bit of a serving cell in which the terminal is located.

In another possible design manner of the second aspect, the status setting unit is specifically configured to: when the terminal is located in a primary cell or a primary secondary cell and actively switches from the first BWP to a second BWP, clear the buffers of all the HARQ processes that are associated with the second CG configuration, or set all the HARQ processes that are associated with the second CG configuration to be in the not pending status. The second BWP is a BWP that is configured with a PRACH resource and on which the N consecutive uplink LBT failures do not occur, and the second BWP and the first BWP belong to a same serving cell.

In another possible design manner of the second aspect, the terminal further includes a communication unit. The communication unit is configured to receive a BWP switching instruction from the network device. The status setting unit is specifically configured to: in response to the BWP switching instruction, clear the buffers of all the HARQ processes that are associated with the second CG configuration, or set all the HARQ processes that are associated with the second CG configuration to be in the not pending status.

In another possible design manner of the second aspect, the terminal further includes a quantity-of-times counting unit. The quantity-of-times counting unit is configured to: determine each time that the HARQ process that is used to send the uplink data is used for new transmission or retransmission, and determine whether the HARQ process that is used to send the uplink data is in the pending status. If the HARQ process that is used to send the uplink data is in the pending status, a quantity of pending times recorded by a pending counter is increased by 1. An initial value of the quantity of pending times recorded by the pending counter is zero. The status setting unit is further configured to: if the quantity of pending times recorded by the pending counter is equal to a preset quantity-of-times threshold, clear a buffer of the HARQ process that is used to send the uplink data, or set the HARQ process that is used to send the uplink data to be in the not pending status. After the buffer of the HARQ process that is used to send the uplink data is cleared, the HARQ process that is used to send the uplink data is in the not pending status.

In another possible design manner of the second aspect, the terminal further includes a duration counting unit. The duration counting unit is configured to: determine each time that the HARQ process that is used to send the uplink data is used for new transmission or retransmission, and determine whether the HARQ process that is used to send the uplink data is in the pending status or the not pending status. If it is determined that the HARQ process that is used to send the uplink data is in the pending status and a pending timer is not started, start the pending timer. If it is determined that the HARQ process that is used to send the uplink data is in the not pending status and the pending timer is running, stop the pending timer. The status setting unit is further configured to: if timing duration of the pending timer is equal to a preset duration threshold, clear a buffer of the HARQ process that is used to send the uplink data, or set the HARQ process that is used to send the uplink data to be in the not pending status. The pending timer is used to count total duration during which the HARQ process that is used to send the uplink data is in the pending status in the process of transmitting the uplink data. After the buffer of the HARQ process that is used to send the uplink data is cleared, the HARQ process that is used to send the uplink data is in the not pending status.

According to a third aspect, an embodiment of this application provides a terminal. The terminal includes a processor, a memory, and a communication interface. The memory and the communication interface are coupled to the processor, the memory is configured to store computer program code, and the computer program code includes computer instructions. The memory includes a nonvolatile storage medium. When the processor executes the computer instructions, the terminal is enabled to perform the method according to any one of the first aspect and the possible design manners of the first aspect.

According to a fourth aspect, an embodiment of this application provides a computer storage medium. The computer storage medium includes computer instructions, and when the computer instructions are run on a terminal, the terminal is enabled to perform the method according to any one of the first aspect and the possible design manners of the first aspect.

According to a fifth aspect, an embodiment of this application provides a computer program product. When the computer program product is run on a terminal, the terminal is enabled to perform the method according to any one of the first aspect and the possible design manners of the first aspect.

For technical effects brought by any one of the second aspect and the possible design manners of the second aspect, the third aspect, the fourth aspect, and the fifth aspect of in embodiments of this application, refer to the technical effects brought by different design manners of the first aspect. Details are not described herein again.

DETAILED DESCRIPTION OF ILLUSTRATIVE EMBODIMENTS

Terms "first", "second", and the like in embodiments of this application are used to distinguish between different objects or between different processing on a same object, but are not used to describe a specific order of the objects. For example, a first BWP and a second BWP are different BWPs.

A HARQ process-based data transmission method provided in embodiments of this application may be applied to a process in which a terminal transmits uplink data to a network device.

Figure 1:
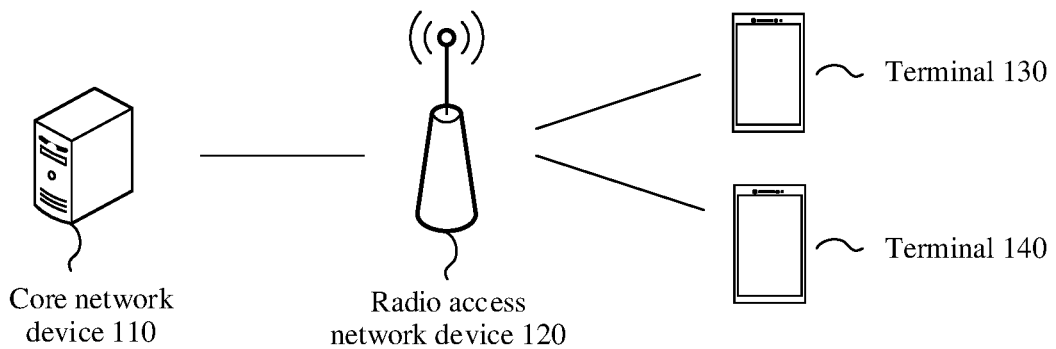
FIG. 1 is a simplified schematic diagram of a system architecture according to an embodiment of this application.

FIG. 1 is a schematic architectural diagram of a mobile communication system according to an embodiment of this application. As shown in FIG. 1, the mobile communication system may include a core network device 110, a radio access network device 120, and at least one terminal (including a terminal 130 and a terminal 140). The at least one terminal is connected to the radio access network device 120 in a wireless manner, and the radio access network device 120 is connected to the core network device 110 in a wireless or wired manner. The core network device 110 and the radio access network device 120 may be different independent physical devices, or functions of the core network device 110 and logical functions of the radio access network device 120 may be integrated on a same physical device, or a part of functions of the core network device 110 and a part of functions of the radio access network device 120 may be integrated on one physical device. The terminal 130 or the terminal 140 may be at a fixed place, or may be movable. In embodiments of this application, at least one may be one, two, three, or more. This is not limited in embodiments of this application.

It should be noted that FIG. 1 is only a schematic diagram. The mobile communication system may further include another network device, for example, may further include a wireless relay device and a wireless backhaul device that are not shown in FIG. 1. A quantity of core network devices 110, radio access network devices 120, and terminals included in the mobile communication system is not limited in embodiments of this application.

The radio access network device 120 is an access device used by the terminal to access the mobile communication system in a wireless manner, and may be a base station, an evolved NodeB (eNodeB), a transmission reception point (TRP), a next generation NodeB (gNB) in the 5G mobile communication system, a base station in a future mobile communication system, an access node in a Wi-Fi system, or the like. Alternatively, the radio access network device 120 may be a module or a unit that completes a part of functions of the base station. For example, the radio access network device 120 may be a central unit (CU), or may be a distributed unit (DU). A specific technology and a specific device form that are used by the radio access network device 120 are not limited in this embodiment of this application. In embodiments of this application, the radio access network device 120 is referred to as a network device for short. Unless otherwise specified, network devices are all the radio access network devices 120.

In embodiments of this application, an apparatus configured to implement a function of the radio access network device 120 may be a network device, or may be an apparatus that can support the radio access network device 120 in implementing the function, for example, a chip system. The apparatus may be installed in the radio access network device 120 or used together with the radio access network device 120. In the technical solutions provided in embodiments of this application, the technical solutions provided in embodiments of this application are described by using an example in which the apparatus configured to implement the function of the radio access network device 120 is the network device.

The terminal in embodiments of this application may also be referred to as a terminal, user equipment (UE), a mobile station (MS), a mobile terminal (MT), or the like. The terminal may be a mobile phone, a tablet computer, a computer having a wireless transceiver function, a virtual reality terminal, an augmented reality terminal, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form used by the terminal are not limited in embodiments of this application. In an embodiment, FIG. 1 uses an example in which the terminal 130 and the terminal 140 included in the system architecture of this application are both mobile phones.

In embodiments of this application, an apparatus configured to implement a function of the terminal may be a terminal, or may be an apparatus that can support the terminal in implementing the function, for example, a chip system. The apparatus may be installed in the terminal or used together with the terminal. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is the terminal.

The network device and the terminal may be deployed on land, where the deployment includes indoor or outdoor, or handheld or vehicle-mounted deployment, may be deployed on water, or may be deployed on an aerocraft, a balloon, or an artificial satellite in air. Application scenarios of the network device and the terminal are not limited in embodiments of this application.

In the mobile communication system, the terminal may access the network device, and perform wireless communication with the network device. For example, one network device may manage one or more (for example, three or six) cells, and the terminal may access the network device in at least one of the one or more cells, and communicate with the network device in a cell in which the terminal is located.

A basis of wireless communication is a spectrum resource. Spectrum resources are classified into a licensed spectrum and an unlicensed spectrum. The licensed spectrum can be used only by a specific operator in a place, and the unlicensed spectrum can be used by any operator and is a shared spectrum resource. The network device and the terminal may communicate with each other by using the licensed spectrum, may communicate with each other by using the unlicensed spectrum, or may communicate with each other by using both the licensed spectrum and the unlicensed spectrum. For example, the network device and the terminal may communicate with each other by using a spectrum below 6 gigahertz (GHz), may communicate with each other by using a spectrum above 6 GHz, or may communicate with each other by using both a spectrum below 6 GHz and a spectrum above 6 GHz. Embodiments of this application are mainly specific to a case in which the terminal communicates with the network device by using the unlicensed spectrum.

For example, in embodiments of this application, interaction between the radio access network device 120 and the terminal 130 is used as an example herein to describe the radio access network device 120 and the terminal 130 in the system architecture shown in FIG. 1.

The radio access network device 120 activates a first BWP for the terminal 130, and configures, for the terminal 130 on the first BWP, at least one CG configuration and a HARQ process that is associated with the at least one CG configuration. Then, the terminal 130 may send uplink data to the radio access network device 120 by using a HARQ process that is associated with an activated CG configuration on the first BWP. If the uplink data fails to be sent, the terminal 130 continues to send the uplink data by using the HARQ process. If the uplink data is successfully sent, the terminal 130 waits for a feedback from the radio access network device 120. If an ACK feedback of the radio access network device 120 is received, the terminal 130 determines that the uplink data is successfully transmitted to the radio access network device 120. If a NACK feedback of the radio access network device 120 is received, the terminal 130 determines that the uplink data fails to be transmitted to the radio access network device 120, and may continue to send the uplink data by using the HARQ process.

Figure 2:
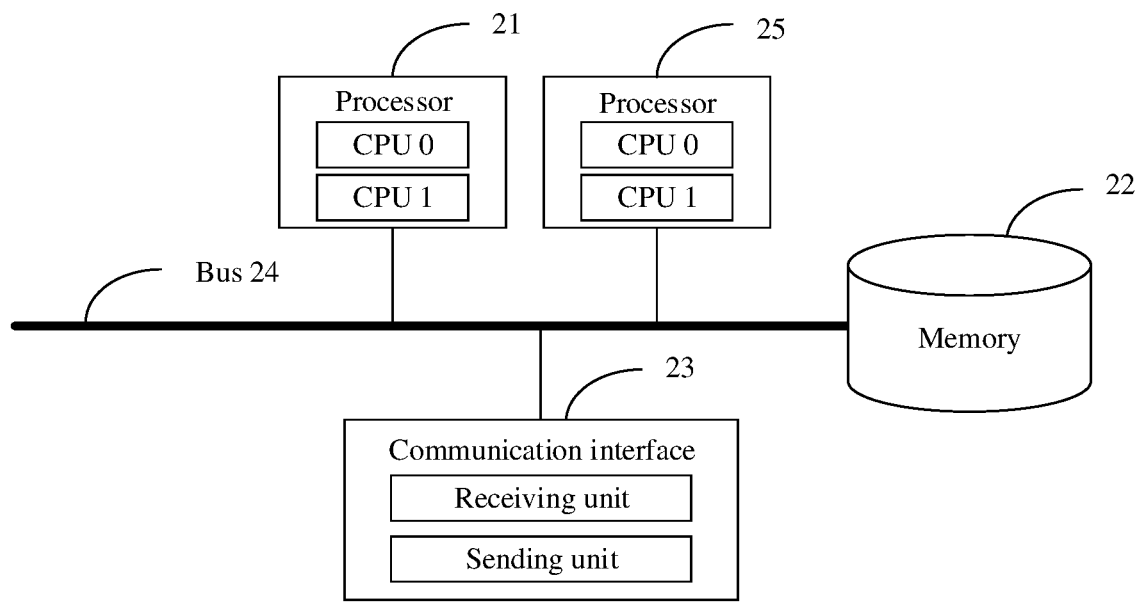
FIG. 2 is a schematic diagram of a hardware structure of a terminal according to an embodiment of this application.

FIG. 2 is a schematic diagram of a hardware structure of a terminal according to an embodiment of this application. As shown in FIG. 2, the terminal may include at least one processor 21, a memory 22, a communication interface 23, and a bus 24.

The following describes each composition part of the terminal in detail with reference to FIG. 2.

The processor 21 may be one processor, or may be a collective term for a plurality of processing elements. For example, the processor 21 may be a central processing unit (CPU), an application-specific integrated circuit (ASIC), or one or more integrated circuits for controlling program execution in the solutions of this application, for example, one or more microprocessors (DSP), or one or more field programmable gate arrays (FPGAs).

The processor 21 may perform various functions of the terminal by running or executing a software program stored in the memory 22 and invoking data stored in the memory 22.

During specific implementation, in an embodiment, the processor 21 may include one or more CPUs. For example, as shown in FIG. 2, the processor 21 includes a CPU 0 and a CPU 1.

During specific implementation, in an embodiment, the terminal may include a plurality of processors. For example, as shown in FIG. 2, the terminal includes the processor 21 and a processor 25. Each of the processors may be a single-core processor (single-CPU) or may be a multi-core processor (multi-CPU). The processor herein may be one or more devices, circuits, and/or processing cores configured to process data (for example, computer program instructions).

The memory 22 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory 22 is not limited thereto. The memory 22 may exist independently and be connected to the processor 21 through the bus 24. Alternatively, the memory 22 may be integrated with the processor 21. The memory 22 is configured to store a software program that executes the solutions of this application, and the processor 21 controls execution.

The communication interface 23 is configured to communicate with another device or a communication network, for example, is configured to communicate with a communication network such as an ethernet, a radio access network (RAN) a wireless local area network (WLAN). The communication interface 23 may include a receiving unit for implementing a receiving function and a sending unit for implementing a sending function.

The bus 24 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, in FIG. 2, only one thick line is used for representation, but it does not mean that there is only one bus or only one type of bus.

The structure of the device shown in FIG. 2 imposes no limitation on the terminal. The terminal may include components more or fewer than those shown in the figure, combine a part of components, or have different component arrangements. Although not shown, the terminal may further include a battery, a camera, a Bluetooth module, a global positioning system (GPS) module, a display, and the like. Details are not described herein.

The following describes terms used in embodiments of this application.

(i) LBT channel contention access technology: Before data transmission, a channel occupation status of an unlicensed spectrum may be monitored, and a channel can be used only when a condition for an idle channel is met. Because the unlicensed spectrum is a shared spectrum, many air interface technologies use the unlicensed spectrum, for example, Wi-Fi, a licensed Assisted access (LAA) based on long term evolution (LTE), and a MulteFire technology. To ensure that a plurality of air interface technologies coexist on the unlicensed spectrum, an LBT mechanism is used to avoid mutual interference between the plurality of air interface technologies.

An LBT failure means that a channel fails to be occupied because the channel is busy, and a signal (for example, data or an instruction) cannot be transmitted. An LBT success means that a channel is successfully occupied and data is transmitted. For different signal transmission directions, transmission signals are classified into uplink transmission and downlink transmission. The uplink transmission means that a terminal transmits a signal to a network device through a channel. The channel used for the uplink transmission is referred to as an uplink channel. The signal in the uplink transmission is referred to as an uplink signal (for example, uplink data or an uplink instruction). The downlink transmission means that a network device transmits a signal to a terminal through a channel. The channel used for the downlink transmission is referred to as a downlink channel. The signal in the downlink transmission is referred to as a downlink signal (for example, downlink data or a downlink instruction). Correspondingly, LBT is classified into uplink LBT and downlink LBT. The uplink LBT means that a terminal monitors a channel occupation status of an unlicensed spectrum before uplink transmission, and the downlink LBT means that a network device monitors a channel occupation status of an unlicensed spectrum before downlink transmission.

Channel access processes in which the LBT is used are classified into two types. A first type is energy detection based on fixed duration. A transmitting end (a terminal or a network device) detects a signal strength of a channel in an unlicensed spectrum. If the signal strength is greater than a preset threshold, it is considered that the channel is busy; if the signal strength is not greater than a preset threshold, it is considered that the channel is idle. A second type is energy detection based on a backoff mechanism. The transmitting end (the terminal or the network device) randomly selects a value A from a value range (for example, a window [min, max], where min is a minimum value, and max is a maximum value). If at least A idle energy detection slots are detected on the channel in the unlicensed spectrum, it is considered that the channel is idle; if less than A idle energy detection slots are detected on the channel in the unlicensed spectrum, it is considered that the channel is busy. Each idle energy detection slot is a slot in which the signal strength of the channel is not greater than the preset threshold. The transmitting end (the terminal or the network device) may use a channel to transmit data only when considering that the channel is idle.

An LBT counter and an LBT timer are introduced in an NR-U technology. The LBT counter is used to record a quantity of uplink LBT failures (that is, the uplink channel fails to be occupied because the uplink channel is busy). The LBT timer is used to count the duration of detected consecutive uplink LBT failures. Each time an uplink LBT fails, the LBT counter increases by 1. At the same time, the LBT timer starts or restarts. When the quantity of uplink LBT failures recorded by the LBT counter is equal to a preset quantity-of-times threshold of failures, it is considered that the consecutive uplink LBT failures occur. The LBT counter is reset if timing duration of the LBT timer is equal to a preset failure duration threshold.

(2) BWP: With development of communication technologies, an available spectrum bandwidth becomes larger, and in particular, a spectrum bandwidth used by NR is very large. To use a spectrum more flexibly, a BWP technology is introduced in NR. To be specific, a bandwidth part BWP in the available spectrum bandwidth is configured for a terminal. A network device may activate an appropriate BWP for the terminal based on load of the network device and a service requirement of the terminal. For example, the network device determines that the terminal processes a large quantity of data services, and activates a large BWP for the terminal. The network device finds that load of a currently activated BWP of the terminal is heavy, and activates another idler BWP for the terminal.

Specifically, an existing NR protocol specifies that after the terminal accesses a serving cell (for example, a primary cell, a secondary cell, or a primary secondary cell) of the network device, the network device configures a dedicated BWP for the terminal based on the load of the network device and the service requirement of the terminal, and configures a maximum of four dedicated BWPs. Then, the network device selects one of the configured BWPs to activate. In addition, the network device can only activate for any terminal only one BWP in a serving cell in which the any terminal is located.

When N consecutive uplink LBT failures (or referred to as consecutive uplink LBT failures) occur on a currently activated BWP of the serving cell in which the terminal is located, the terminal triggers a MAC CE (namely, an LBT failure MAC CE) report for the network device. The MAC CE is in a bitmap form, and indicates whether the N consecutive uplink LBT failures occur in a corresponding serving cell. If the terminal successfully sends the MAC CE, the terminal cancels an N consecutive uplink LBT failure status of the corresponding serving cell. In addition, the terminal may cancel the N consecutive uplink LBT failure status of the corresponding serving cell on other occasions. For example, the network device sends a BWP switching instruction to the terminal, to indicate the serving cell in which the terminal is located to switch from a currently activated BWP to another BWP; or to indicate to no longer use a serving cell when the serving cell in which the terminal is located is deactivated. An occasion for canceling the N consecutive uplink LBT failure status of the corresponding serving cell is not limited in this embodiment of this application.

It should be noted that, when the serving cell in which the terminal is located is a secondary cell, because the terminal cannot actively switch a BWP in the secondary cell, the terminal needs to send the MAC CE by using another serving cell in which the N consecutive uplink LBT failures do not occur. In addition, the MAC CE in this embodiment of this application is the LBT failure MAC CE.

When the serving cell in which the terminal is located is a primary cell (PCell) or a primary secondary cell (PSCell), and the N consecutive uplink LBT failures are detected on the currently activated BWP of the serving cell, the terminal may actively switch from the currently activated BWP to a second BWP. The second BWP is a BWP that is configured with a PRACH resource and on which the N consecutive uplink LBT failures do not occur in the serving cell. Then, the terminal initiates a RACH random access procedure, to complete LBT failure recovery (that is, the terminal sends and receives data with the network device by using a BWP that is switched to). The RACH random access procedure includes: notifying, by interacting with the network device, the network device of the terminal and the BWP that is of the terminal and that is switched to. The BWP that is switched to is used to send and receive the data between the network device and the terminal.

(3) HARQ process: The HARQ process refers to a data transmission process using a HARQ technology. The HARQ technology combines a forward error correction (FEC) technology and an automatic repeat request (ARQ) technology. The FEC technology may be used to improve communication trustworthiness. However, in a unidirectional communication channel (for example, an LTE FDD system), when a receiving end receives a data packet (for example, uplink data) sent by a transmitting end, if the receiving end detects an uncorrectable error, the receiving end cannot request the transmitting end to retransmit the data packet. In the HARQ technology, however, the receiving end may request, by using an ARQ mechanism, the transmitting end to retransmit the data packet. Specifically, the receiving end may check, by using a cyclic redundancy check (CRC), whether the received data packet is incorrect. If the data packet is correct, the receiving end returns an ACK feedback of the data packet to the transmitting end; or if the data packet is incorrect, the receiving end sends a NACK feedback of the data packet to the transmitting end, and the receiving end retransmits the data packet to the receiving end after receiving the NACK feedback of the data packet.

Uplink data transmission is used as an example. The network device (namely, the receiving end) receives uplink data sent by the terminal (namely, the transmitting end) by using the HARQ process on a resource indicated by an uplink grant (UL grant). If the network device correctly receives the uplink data, a status of HARQ feedback performed by the network device on a downlink is an ACK (namely, the network device feeds back an ACK feedback of the uplink data to the terminal). If the network device does not correctly receive the uplink data, the status of the HARQ feedback performed by the network device on the downlink is a NACK (namely, the network device feeds back a NACK feedback of the uplink data to the terminal). In other words, the HARQ feedback being the ACK indicates that the network device correctly receives the uplink data, and the HARQ feedback being the NACK indicates that the network device does not correctly receive the uplink data. Then, if receiving the NACK fed back by the network device, the terminal retransmits the uplink data to the network device, so that the network device can perform HARQ combination on the retransmitted uplink data and the uplink data that is not correctly received.

Generally, the terminal may perform, by using the HARQ process, uplink transmission on the resource indicated by the UL grant. For example, an uplink grant that is associated with the HARQ process is delivered to a HARQ entity of the terminal, so that the uplink data is sent on a resource indicated by the uplink grant that is associated with the HARQ process. The uplink grant may be a dynamic grant (DG) dynamically scheduled by the network terminal, or may be a configured grant CG of the network terminal. One HARQ entity of the terminal may maintain a plurality of parallel HARQ processes. Each HARQ process has one HARQ identifier (ID), and different HARQ processes may be distinguished by using HARQ IDs.

(4) CG configuration: The CG configuration refers to a resource that is required for uplink transmission and that is preconfigured by a network device in an NR-U for a terminal. The preconfigured resource required for the uplink transmission may be referred to as the CG configuration or a preconfigured uplink grant configuration. The terminal can perform the uplink transmission on the CG configuration without dynamic scheduling of the network device. The CG configuration includes but is not limited to two preconfigured grant resources used in a 5th generation (5G) mobile communication technology. The two preconfigured grant resources used in the 5G are respectively obtained in two grant types. The two grant types include a configured grant type 1 and a configured grant type 2.

The configured grant type 1 means that the network device preconfigures, for the terminal in a semi-static configuration manner, the resource (the CG configuration) required for the uplink transmission, that is, periodically configures an activated CG configuration, and the terminal does not need to obtain an uplink grant of the CG configuration from the network device each time before sending uplink data. For example, the network device may configure, for the terminal by using RRC signaling, the CG configuration that is used for the uplink transmission, where the RRC signaling may further include a period of the CG configuration.

The configured grant type 2 means that the network device may configure, for the terminal by using the RRC signaling, some information that is used for the uplink transmission, for example, the period of the CG configuration that is used for the uplink transmission. Then, the network device activates the CG configuration by using physical layer signaling that carries the CG configuration used for the uplink transmission, so that the terminal can perform the uplink transmission in the CG configuration. The physical layer signaling includes DCI.

It should be noted that names of the foregoing two grant types are not limited to the configured grant type 1 and the configured grant type 2, and may further have other names. Names of the two grant types are not limited in this embodiment of this application. In addition to a 5G communication system, a communication system to which the foregoing two grant types are applicable may alternatively be an LTE communication system or another communication system. The communication system to which the two grant types are applicable is not limited in this embodiment of this application either.

An NR-U system supports a plurality of CG configurations, that is, the terminal may simultaneously support a plurality of CG configurations on a currently activated BWP, and the plurality of different CG configurations may share a HARQ process. When transmitting the uplink data by using any CG configuration, the terminal randomly selects a HARQ process from HARQ processes that are associated with (supported by) the CG configuration. Then, the terminal sends the uplink data on the CG configuration by using the HARQ process. If an uplink LBT succeeds, it indicates that the uplink data is sent successfully; if an uplink LBT fails, the uplink data fails to be sent, and the uplink data is resent. A process of transmitting one piece of uplink data includes new transmission and retransmission for the same piece of uplink data. A first time of sending the uplink data in the process of transmitting the piece of uplink data is referred to as the new transmission, and the new transmission may also be referred to as initial transmission. After the new transmission is successfully sent, if the network device does not correctly receive the uplink data, it indicates that the new transmission fails, and the terminal may retransmit the uplink data until transmission succeeds or a maximum transmission duration is reached. Each sending of the uplink data after the new transmission fails in the process of transmitting the piece of uplink data is referred to as the retransmission.

In addition, the NR-U system further supports retransmission of cross-CG configurations, provided that UE selects a same HARQ process in different CG configurations and the different CG configurations have a same transport packet size (TBS).

A configured grant timer CGT is defined in an NR system. The CGT is used to limit total duration of a transmission process, and the CGT corresponds to a transmission duration threshold. Because the NR-U system still uses a mechanism of the NR system, the NR-U system may use the CGT. In addition, to limit a retransmission interval, a configured grant retransmission timer CGRT is newly defined in the NR-U system. The CGRT is used to limit a transmission interval between the new transmission and the retransmission in the transmission process and a transmission interval between two retransmissions. The CGRT corresponds to a retransmission duration threshold. The retransmission duration threshold is less than the transmission duration threshold. In the NR-U system, the terminal may use the CGRT and the CGT to control the new transmission and the retransmission.

Specifically, the terminal uses a HARQ process that is associated with a CG configuration for the new transmission. If the uplink LBT succeeds, it indicates that the uplink data is sent successfully, and the CGT and the CGRT are started; or if the uplink LBT fails, the CGT and the CGRT are not started. After the CGT and the CGRT are started, in a timing period of the CGT, if timing duration of the CGRT is equal to the retransmission duration threshold or a NACK feedback from the network device is received, the terminal stops the CGRT, and performs automatic retransmission by using the HARQ process. The terminal uses the HARQ process for the retransmission. If the uplink LBT succeeds, it indicates that the uplink data is retransmitted successfully, and the CGRT is restarted; if the uplink LBT fails, the CGRT is not restarted, and the HARQ process is still used for the retransmission. If timing duration of the CGT is equal to the transmission duration threshold or an ACK feedback from the network device is received, the CGT and the CGRT are stopped. In this case, the terminal may use the HARQ process to newly transmit other uplink data.

If the terminal performs the automatic retransmission, only the CGRT is restarted, and the CGT is not restarted. If the ACK feedback from the network device is received, it indicates that the network device correctly receives the uplink data. The terminal does not stop the CGT when receiving the NACK feedback, but stops the CGT when receiving the ACK feedback.

It may be understood that during the timing period of the CGT in the HARQ process, the terminal cannot use the HARQ process to transmit the other uplink data. In this way, a packet loss caused by overwriting the uplink data in a HARQ buffer of the HARQ process by the other uplink data can be avoided.

Figure 3:
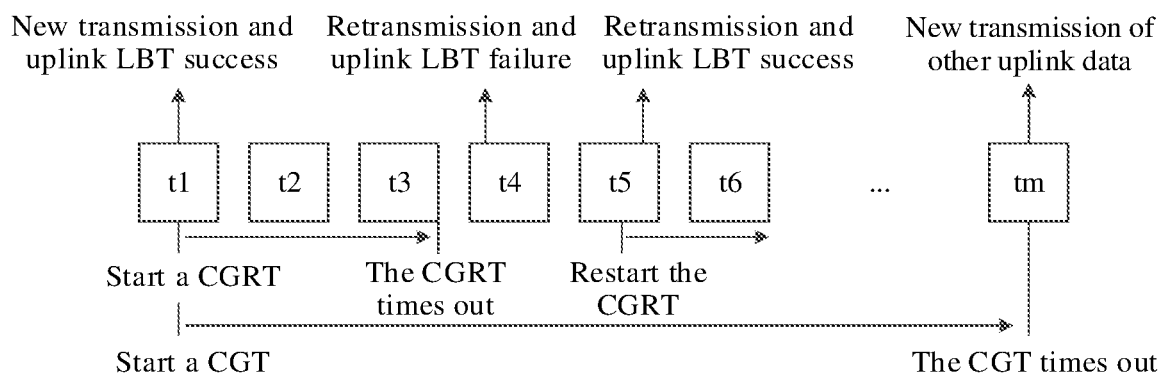
FIG. 3 is a schematic diagram of a principle of a method for sending uplink data by a terminal to a network device according to an embodiment of this application.

For example, as shown in FIG. 3, a process in which a terminal transmits uplink data by using one HARQ process that is associated with one CG configuration may be divided into a plurality of time units in time domain. The plurality of time units include t1, t2, t3, t4, t5, t6, . . . , and tm sorted in a time sequence, where m is a positive integer. The plurality of time units may be consecutive, or may have a time interval. This is not particularly limited in this embodiment of this application. A length of a time unit may be randomly set. This is not particularly limited in this embodiment of this application. For example, one time unit may include one or more subframes; or one time unit may include one or more slots. In addition, both that the timing duration of the CGRT is equal to the retransmission duration threshold and that the NACK feedback is received may be considered that the CGRT times out. Both that the timing duration of the CGT is equal to the transmission duration threshold and that the ACK feedback from the network device is received may be considered that the CGT times out.

On this basis, it indicates that the process in which the terminal transmits the uplink data by using the HARQ process may include: If the terminal performs the new transmission at t1 and the uplink LBT succeeds, the terminal starts the CGT and the CGRT, and waits for the network device to receive the uplink data. After t2 and t3, the CGRT times out. The terminal stops the CGRT and uses the HARQ process for the automatic retransmission at t4. If the uplink LBT fails at t4, the CGRT is not restarted and the HARQ process is still used for the retransmission at t5. If the terminal performs the retransmission at t5, and the uplink LBT succeeds, restart the CGRT, and wait for the network device to receive the uplink data. At tm, the CGT times out, and the terminal stops the CGT and CGRT. In this case, the terminal may use the HARQ process to newly transmit other uplink data.

It may be understood that, in the foregoing technology, if the terminal fails to send the uplink data when starting the new transmission by using the HARQ process, the terminal does not start the CGT and the CGRT, and cannot retransmit the uplink data, and the uplink data is continuously stored in the HARQ buffer of the HARQ process. Because the CGT is not started, if no other mechanism is introduced, the terminal may use the HARQ process to newly transmit the other uplink data, and the other uplink data overwrites the uplink data in the HARQ buffer. In this way, the uplink data is not sent to the network device, and the HARQ process is no longer used to send the uplink data. That is, the uplink data is discarded, and the uplink data can be retransmitted only by relying on a higher layer.

To solve this problem, a pending status of the HARQ process is introduced in the NR-U system. For the new transmission and the retransmission, when the uplink data is successfully sent by using the HARQ process (namely, the uplink LBT succeeds), the terminal determines that the HARQ process is in a not pending status. When the uplink data is not successfully sent by using the HARQ process, the terminal determines that the HARQ process is in a pending status. Then, after the HARQ process is in the pending status, the pending status of the HARQ process is canceled only after the uplink data is successfully sent or the HARQ buffer of the HARQ process is cleared. Alternatively, the HARQ process is set to be in the not pending status when the CGT times out. That is, when determining whether the HARQ process can perform the new transmission, the terminal not only needs to determine whether the CGRT and the CGT stop timing, but also needs to determine whether the HARQ process is in the not pending status. Only when it is determined that the CGRT and the CGT stop timing and the HARQ process is in the not pending status, the HARQ process is used for the new transmission. If it is determined that the CGRT and the CGT do not stop timing or the HARQ process is not in the not pending status, the HARQ process is used for the retransmission. In this way, a case in which the uplink data is discarded because the uplink LBT failure occurs during the new transmission, the CGT is not started, and the terminal uses the HARQ process to newly transmit the other uplink data can be avoided.

However, in the foregoing solution, after the HARQ process is used for the new transmission, it can be determined that the HARQ process is in the pending status or the not pending status only when the uplink LBT succeeds or the uplink LBT fails in the new transmission. In this case, when the HARQ process is initially used, the terminal does not know a status of the HARQ process, and cannot use the HARQ for the new transmission. In other words, there is a lack of an initial status (that is, the not pending status) of the HARQ process, and consequently, the HARQ process cannot be used for the new transmission.

Further, in a process in which the terminal is performing transmission by using a HARQ process that is associated with one or more CG configurations on a currently activated BWP, the terminal determines that N consecutive uplink LBT failures occur on the currently activated BWP of a serving cell in which the terminal is located, and the HARQ process in use may be in the pending status. If the serving cell is a primary cell or a primary secondary cell, the terminal may switch a BWP, and a CG configuration on a BWP that is switched to may also be associated with the HARQ process in the pending status.

Because the HARQ process that is associated with the one or more CG configurations on the BWP before the switching may be in the pending status, the HARQ process cannot be used for the new transmission on the BWP that is switched to. In other words, the foregoing solution of using the pending status further has a problem that when the terminal switches the BWP, the pending status of the HARQ process that is associated with the one or more CG configurations on the BWP before the switching is not clearly processed. As a result, the HARQ process cannot be normally used on the BWP that is switched to.

Finally, if a plurality of consecutive uplink LBT failures occur before the CGT and the CGRT are started in a process of transmitting one piece of uplink data, the HARQ process is continuously in the pending status. In addition, because the uplink LBT failures occur before the CGT and the CGRT are started, the terminal cannot determine duration of the plurality of consecutive uplink LBT failures, and therefore cannot resolve a problem that the HARQ process is occupied for a long time in the transmission process of the one piece of uplink data.

For the foregoing problem, embodiments of this application provide a HARQ process-based data transmission method, to determine the initial status of the HARQ process and further perform uplink transmission by using the HARQ process that is in the not pending status. A problem that the pending status of the HARQ process that is associated with the one or more CG configurations on the BWP before the switching is not clearly processed during the BWP switching can be further resolved, so that the HARQ process can be normally used on the BWP that is switched to. In addition, a problem that the HARQ process is occupied for a long time in the transmission process of the one piece of uplink data because the plurality of consecutive uplink LBT failures occur before the CGT and the CGRT are started may be avoided.

Figure 4:
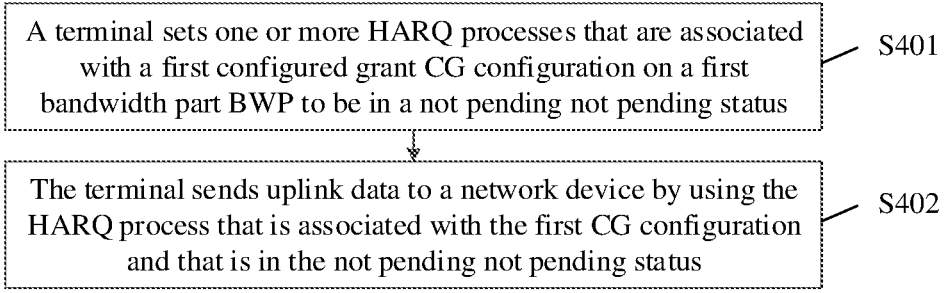
FIG. 4 is a flowchart 1 of a HARQ process-based data transmission method according to an embodiment of this application.

An embodiment of this application provides a HARQ process-based data transmission method. As shown in FIG. 4, the HARQ process-based data transmission method includes S401 and S402.

S401. A terminal sets one or more HARQ processes that are associated with a first configured grant CG configuration on a first bandwidth part BWP to be in a not pending status.

The first CG configuration includes one or more CG configurations configured by a network device for the terminal on the first BWP. The first BWP is a currently activated BWP of the terminal.

For example, the first BWP is one of a plurality of dedicated BWPs configured by the network device for the terminal in a serving cell in which the terminal is located. The first BWP may be a BWP activated by the network device for the terminal. The network device may further configure the first CG configuration for the first BWP. The first CG configuration includes the HARQ process that is associated with the first CG configuration. The terminal may receive the configuration of the network device, and may set the one or more HARQ processes that are associated with the first CG configuration to be in the not pending status.

It should be noted that, in any embodiment of this application, that the terminal sets the foregoing one or more HARQ processes to be in the not pending status is internally implemented by the terminal. "The terminal sets the one or more HARQ processes to be in the not pending status" described in any embodiment of this application may be replaced with "the terminal considers (or determines) that the one or more HARQ processes are in the not pending status" or "the terminal considers (or determines) that the one or more HARQ processes are not pending".

The first CG configuration may be a part or all of CG configurations configured by the network device for the terminal on the first BWP. The one or more HARQ processes that are associated with the first CG configuration may be all or a part of HARQ processes that are associated with the first CG configuration.

In some embodiments, the one or more HARQ processes that are associated with the first CG configuration may include at least any one of the following six HARQ processes:

(1) all the HARQ processes that are associated with the first CG configuration;

(2) a HARQ process that is one of the HARQ processes that are associated with the first CG configuration and that is in a pending status;

(3) a HARQ process that is one of the HARQ processes that are associated with the first CG configuration and that is not in the not pending status;

(4) a first HARQ process that is one of the HARQ processes that are associated with the first CG configuration, where no uplink grant that is associated with the first HARQ process exists in uplink grant currently delivered to a HARQ entity, and that no uplink grant that is associated with the first HARQ process exists in uplink grant currently delivered to a HARQ entity indicates that the first HARQ process is not used by the terminal;

(5) a HARQ process that is one of the HARQ processes that are associated with the first CG configuration and that is not being used; and (6) a corresponding HARQ process that is one of the HARQ processes that are associated with the first CG configuration, where the corresponding HARQ process is a HARQ process randomly selected by the terminal.

The uplink grants currently delivered to the HARQ entity of the terminal (that is, uplink grants currently processed by the HARQ entity of the terminal) are uplink grants that are associated with the HARQ process and that are delivered to the HARQ entity before a current moment. That no uplink grant that is associated with the first HARQ process exists in uplink grant currently delivered to a HARQ entity indicates that the terminal has not used the first HARQ process before the current moment. The corresponding HARQ process may be used to send uplink data, and the corresponding HARQ process is randomly selected inside the terminal.

It should be noted that, because different CG configurations may share a HARQ process, when transmitting the uplink data by using any CG configuration (including the first CG configuration), the terminal may randomly select a HARQ process from the HARQ processes that are associated with the first CG configuration. Therefore, a part of HARQ processes in the first CG configuration may have been used by another CG configuration or are being used by another CG configuration. The another CG configuration is a CG configuration other than the first CG configuration. Because the network device may dynamically schedule any HARQ process by using a DG, a part of HARQ processes in the first CG configuration may have been scheduled by the DG or are being scheduled by the DG. The foregoing description "not used" may mean being used by no CG configuration or DG of the terminal. The foregoing description "not being used" may mean not being used by another CG configuration and/or another DG (where the terminal is transmitting data on the another CG configuration by using the HARQ process).

It may be understood that the terminal may set a HARQ process that is one of the HARQ processes that are associated with the first CG configuration and that has not been used to be in the not pending status. This is because if a HARQ process has been used, it indicates that transmission has been performed. According to an existing communication protocol, the HARQ process is already in the not pending status, and there is no problem of a lack of an initial status. In addition, the terminal may further set a HARQ process that is one of the HARQ processes that are associated with the first CG configuration and that is not being used to be in the not pending status. This is because if a HARQ process is being used, a status of the HARQ process cannot be randomly changed before transmission is completed. If the status of the HARQ process is randomly changed, uplink data being transmitted may be discarded (in other words, a packet loss may occur). Therefore, only the HARQ process that is one of the HARQ processes that are associated with the first CG configuration and that is not being used is set.

In some embodiments, the one or more HARQ processes that are associated with the first CG configuration may further include the first HARQ process that is one of the HARQ processes that are associated with the first CG configuration and the HARQ process that is one of the HARQ processes that are associated with the first CG configuration and that is not being used.

S402. The terminal sends uplink data to the network device by using a HARQ process that is associated with the first CG configuration and that is in the not pending status.

When the terminal needs to send the uplink data, the terminal may select one HARQ process from the one or more HARQ processes that are associated with the first CG configuration and that are set to be in the not pending status. Because the HARQ process is in the not pending status, the terminal may send the uplink data by using the HARQ process.

According to the HARQ process-based data transmission method provided in this embodiment of this application, when receiving the configuration of the network device, the terminal may set, to be in the not pending status, the one or more HARQ processes that are associated with the first CG configuration configured by the network device. In this way, an initial status (that is, the not pending status) of the one or more HARQ processes is set. The one or more HARQ processes that are associated with the first CG configuration are already in the not pending status before being used for uplink transmission, that is, the one or more HARQ processes that are associated with the first CG configuration may be used for the uplink transmission, or the one or more HARQ processes that are associated with the first CG configuration may be used for new transmission. Therefore, the terminal may send the uplink data (or newly transmit the uplink data) by using one of the one or more HARQ processes. In this way, the terminal can perform the uplink transmission (or the new transmission) by using a HARQ process whose initial status is the not pending status.

In some embodiments, the network device may configure the CG configuration for the terminal on the first BWP in different configuration manners. First CG configurations obtained by using the different configuration manners are also different. Configuration manners used by the network device may include the foregoing configured grant type 1 and the foregoing configured grant type 2.

Figure 5:
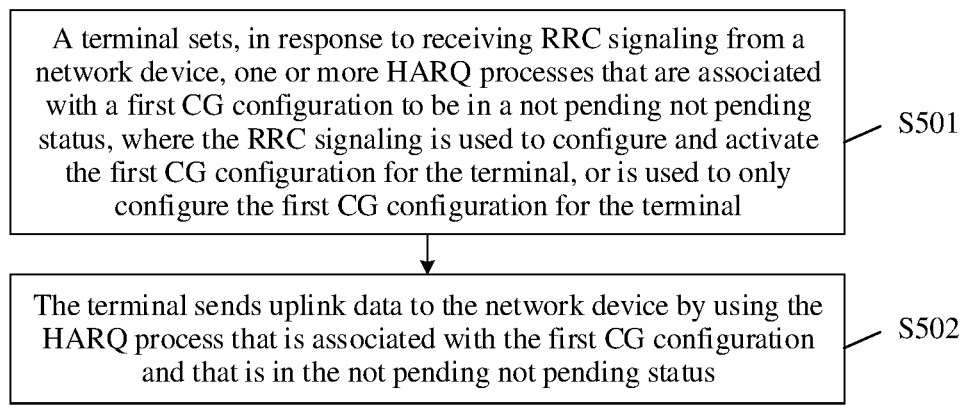
FIG. 5 is a flowchart 2 of a HARQ process-based data transmission method according to an embodiment of this application.

When the network device uses RRC signaling (that is, uses the configured grant type 1 or the configured grant type 2), the first CG configuration includes all CG configurations that are configured and activated by the network device for the terminal on the first BWP by using the configured grant type 1; or the first CG configuration includes all CG configurations that are only configured (that is, configured but not activated) by the network device for the terminal on the first BWP by using the configured grant type 2. Specifically, S401 may include S501. For example, as shown in FIG. 5, the method provided in this embodiment of this application includes S501 and S502.

S501. The terminal sets, in response to receiving RRC signaling from the network device, the one or more HARQ processes that are associated with the first CG configuration to be in the not pending status. The RRC signaling is used to configure and activate the first CG configuration for the terminal, or is used to only configure the first CG configuration for the terminal.

It should be noted that for detailed descriptions of the one or more HARQ processes that are associated with the first CG configuration in S501, refer to the descriptions of the one or more HARQ processes that are associated with the first CG configuration in S401 in the foregoing embodiment. Details are not described herein again in this embodiment of this application.

After receiving the RRC signaling from the network device, the terminal may set, for the first CG configuration indicated by the RRC signaling, the one or more HARQ processes that are associated with the first CG configuration to be in the not pending status.

RRC signaling in the configured grant type 1 is used to configure and activate the first CG configuration for the terminal. RRC signaling in the configured grant type 2 is used to only configure the first CG configuration for the terminal.

S502. The terminal sends uplink data to the network device by using a HARQ process that is associated with the first CG configuration and that is in the not pending status.

It should be noted that an implementation process of step S502 is the same as an implementation process of step S402. Details are not described herein again.

According to the HARQ process-based data transmission method provided in this embodiment of this application, when receiving the first CG configuration configured by the network device, the terminal may set, to be in the not pending status, the one or more HARQ processes that are associated with the first CG configuration. In this way, the one or more HARQ processes that are associated with the first CG configuration are in the not pending status before being used for uplink transmission, indicating that the one or more HARQ processes can be used for new transmission.

Figure 6:
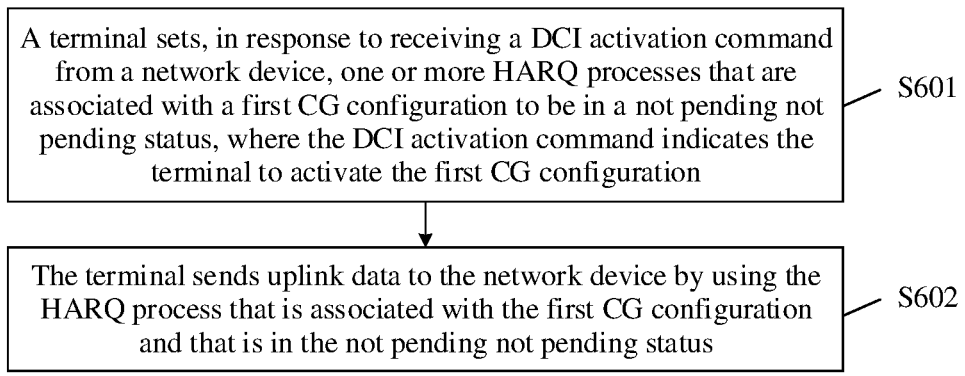
FIG. 6 is a flowchart 3 of a HARQ process-based data transmission method according to an embodiment of this application.

When a DCI activation command is used (that is, the configured grant type 2 is used), the first CG configuration may be a CG configuration that the DCI activation command indicates to activate. Specifically, S401 may further include S601. For example, as shown in FIG. 6, an embodiment of this application provides a HARQ process-based data transmission method including S601 and S602.

S601. The terminal sets, in response to receiving a DCI activation command from the network device, the one or more HARQ processes that are associated with the first CG configuration to be in the not pending status. The DCI activation command indicates the terminal to activate the first CG configuration.

It should be noted that for detailed descriptions of the one or more HARQ processes that are associated with the first CG configuration in S601, refer to the descriptions of the one or more HARQ processes that are associated with the first CG configuration in S401 in the foregoing embodiment. Details are not described herein again in this embodiment of this application.

Before using the DCI activation command, the network device first only configures one or more CG configurations for the terminal on the first BWP by using the RRC signaling in the configured grant type 2, and then activates (initially activates or reactivates) one of the one or more CG configurations by using the DCI activation command. The CG configuration is the first CG configuration. After receiving the DCI activation command from the network device, the terminal sets the one or more HARQ processes that are associated with the first CG configuration to be in the not pending status. The DCI activation command may be an initial activation command or a reactivation command.

The first CG configuration activated by the network device by using the DCI activation command may be a first CG configuration initially activated by using the DCI activation command. In this case, the DCI activation command may also be referred to as the initial activation command. The first CG configuration activated by the network device by using the DCI activation command may alternatively be a first CG configuration reactivated by using the DCI activation command. In this case, the DCI activation command may also be referred to as the reactivation command.

S602. The terminal sends uplink data to the network device by using a HARQ process that is associated with the first CG configuration and that is in the not pending status.

It should be noted that an implementation process of step S602 is the same as an implementation process of step S402. Details are not described herein again.

According to the HARQ process-based data transmission method provided in this embodiment of this application, when receiving the DCI activation command from the network device for the first CG configuration, the terminal may set, to be in the not pending status, the one or more HARQ processes that are associated with the first CG configuration currently to be activated. In this way, the one or more HARQ processes that are associated with the first CG configuration currently to be activated are in the not pending status, indicating that the one or more HARQ processes can be used for new transmission.

It should be noted that, the terminal sets the one or more HARQ processes that are associated with the first CG configuration to be in the not pending status on the foregoing first occasion (that is, in response to receiving the RRC signaling from the network device, or in response to receiving the DCI activation command from the network device). Alternatively, the one or more HARQ processes that are associated with the first CG configuration may be set to be in the not pending status on an occasion other than the first occasion. This is not limited in this embodiment of this application.

For example, for the first HARQ process, S401 may further include: When the terminal processes a grant configuration that is associated with an activated CG configuration, the terminal determines the first HARQ process in all HARQ processes that are associated with the first CG configuration, where the activated CG configuration is the first CG configuration. If no uplink grant that is associated with the first HARQ process exists in the uplink grant currently delivered to the HARQ entity, the terminal device considers that a status of the first HARQ process is the not pending status (that is, sets the status of the first HARQ process to the not pending status). The grant configuration that is associated with the activated CG configuration may appear based on a preset period, and the preset period may be specified by the RRC signaling used in the configured grant type 1 or the configured grant type 2.

In some embodiments, after setting the one or more HARQ processes that are associated with the first CG to be in the not pending status (for example, after step S401, step S501, or step S601), the terminal further detects whether N consecutive uplink LBT failures occur on the currently activated first BWP.

Figure 7:
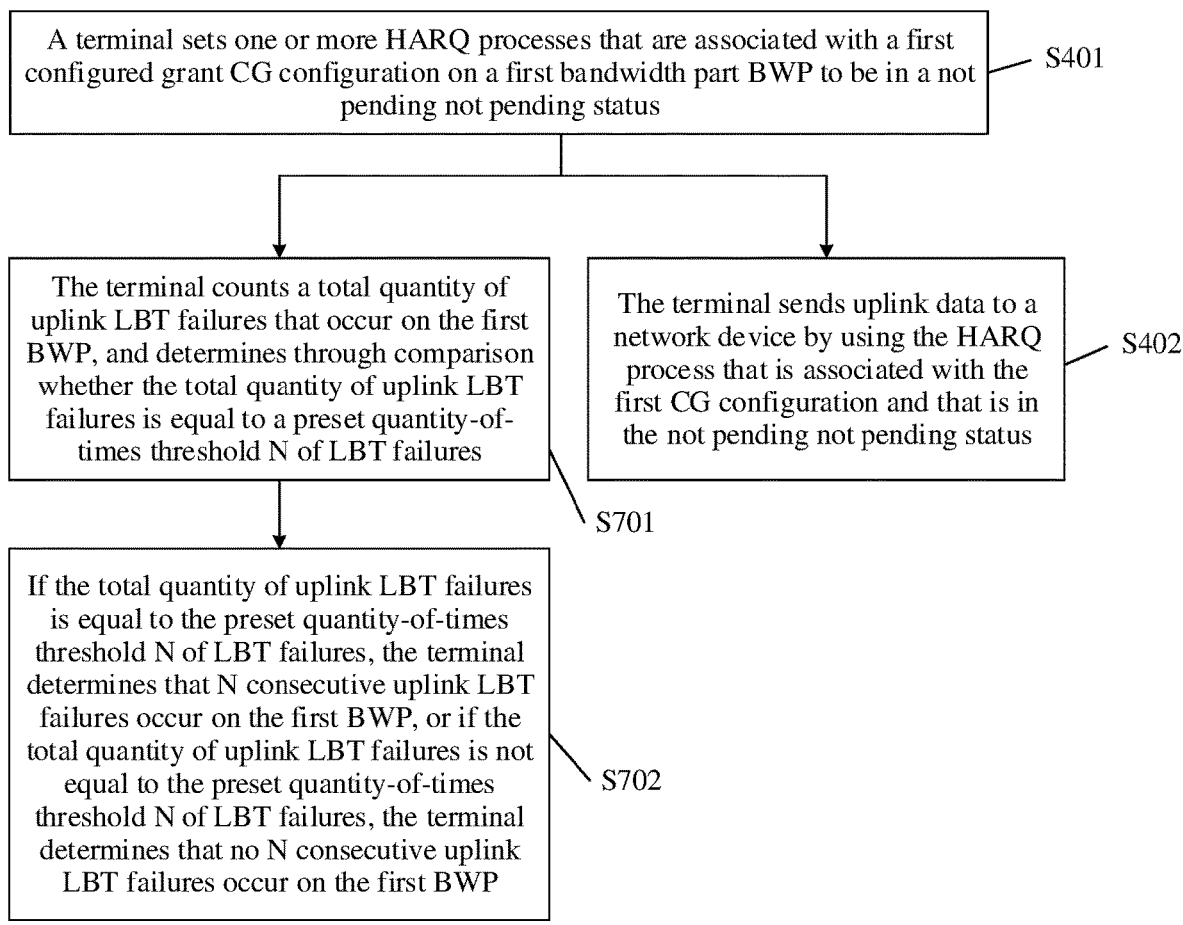
FIG. 7 is a flowchart 4 of a HARQ process-based data transmission method according to an embodiment of this application.

Steps S401 and S402 are used as an example. As shown in FIG. 7, the HARQ process-based data transmission method provided in this embodiment of this application further includes steps S701 and S702 after step S401.

S701. The terminal counts a total quantity of uplink LBT failures that occur on the first BWP, and determines through comparison whether the total quantity of uplink LBT failures is equal to a preset quantity-of-times threshold N of LBT failures.

The total quantity of uplink LBT failures on the first BWP includes a quantity of uplink LBT failures that occur when the terminal transmits uplink data on the first BWP.

S702. If the total quantity of uplink LBT failures is equal to the preset quantity-of-times threshold N of LBT failures, the terminal determines that N consecutive uplink LBT failures occur on the first BWP. If the total quantity of uplink LBT failures is not equal to the preset quantity-of-times threshold N of LBT failures, the terminal determines that no N consecutive uplink LBT failures occur on the first BWP.

The terminal determines that the N consecutive uplink LBT failures occur on the first BWP, and triggers a status of consecutive uplink LBT failures.

It should be noted that steps S701 and S702 and step S402 in FIG. 7 are parallel, and an execution sequence of steps S701 and S702 and step S402 in FIG. 7 is merely an example for description. In step S701, a quantity of uplink LBT failures in a process of performing step S402 may be counted, or a quantity of uplink LBT failures in a process of performing step S402 and a subsequent process of sending other uplink data may be counted.

Figure 8:
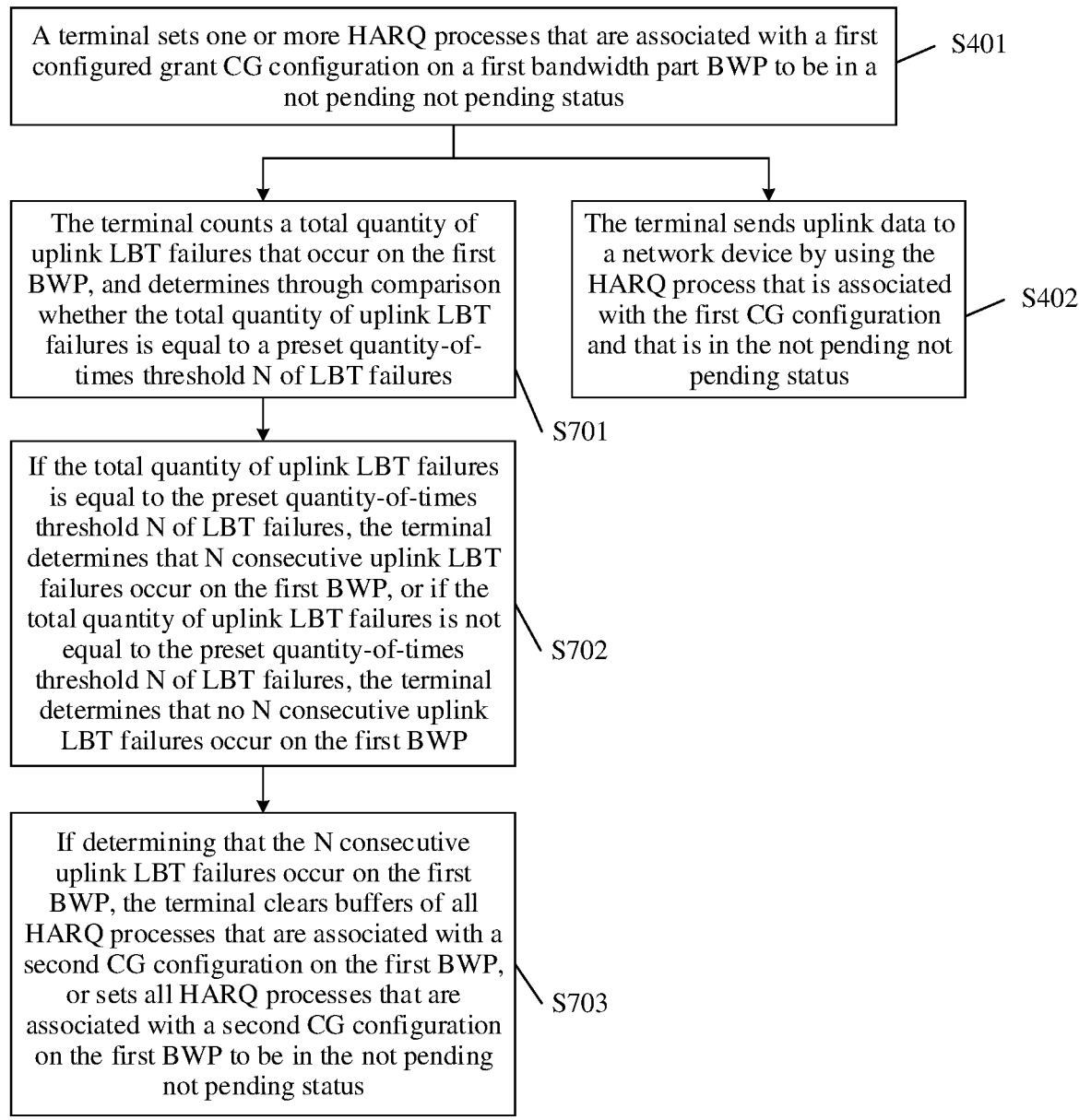
FIG. 8 is a flowchart 5 of a HARQ process-based data transmission method according to an embodiment of this application.

Further, as shown in FIG. 8, after step S702, the HARQ process-based data transmission method further includes step S703.

Step S703. If determining that the N consecutive uplink LBT failures occur on the first BWP, the terminal clears buffers of all HARQ processes that are associated with a second CG configuration on the first BWP, or sets all HARQ processes that are associated with a second CG configuration on the first BWP to be in the not pending status.

The second GG includes all CG configurations configured by the network device for the terminal on the first BWP or an activated CG configuration for the terminal on the first BWP. After the buffers of all the HARQ processes that are associated with the second GG are cleared, all the HARQ processes that are associated with the second GG are in the not pending status.

If determining that the N consecutive uplink LBT failures occur on the first BWP, the terminal directly triggers clearing the buffers of all the HARQ processes that are associated with the second CG configuration on the first BWP, or directly triggers setting all the HARQ processes that are associated with the second CG configuration on the first BWP to be in the not pending status.

It should be noted that the second CG configuration may be the same as the first CG configuration, or may be different from the first CG configuration.

In this embodiment of this application, in a process in which the terminal performs transmission by using the HARQ process that is associated with the one or more CG configurations on the first BWP (namely, a BWP that is not switched), the terminal determines that the N consecutive uplink LBT failures occur on the first BWP, indicating that the HARQ process being used on the first BWP may be in the pending status. In this case, the terminal sets all the HARQ processes that are associated with the second CG configuration on the first BWP to be in the not pending status. The terminal may set all the HARQ processes that are associated with the second CG configuration on the first BWP to be in the not pending status by clearing the buffers of all the HARQ processes that are associated with the second CG configuration on the first BWP or setting all the HARQ processes that are associated with the second CG configuration to be in the not pending status. It may be understood that all the HARQ processes that are associated with the second CG configuration may include a HARQ process that is in the pending status on the first BWP. Therefore, all the HARQ processes that are associated with the second CG configuration on the first BWP may be set to be in the not pending status by clearing the buffers of all the HARQ processes that are associated with the second CG configuration on the first BWP or setting all the HARQ processes that are associated with the second CG configuration to be in the not pending status.

In this way, a problem that a status of a HARQ process in the pending status on the first BWP (namely, the BWP that is not switched) is not processed when the terminal performs BWP switching is resolved. Further, a CG configuration of the terminal on a second BWP (namely, a BWP that is switched to) may be associated with the HARQ process in the pending status on the first BWP. Because the HARQ process in the pending status on the first BWP has been set to be in the not pending status, the HARQ process can be used for new transmission on the BWP that is switched to.

In some embodiments, if determining that the N consecutive uplink LBT failures occur on the first BWP, when sending a MAC CE to the network device, the terminal clears the buffers of all the HARQ processes that are associated with the second CG configuration on the first BWP, or sets all the HARQ processes that are associated with the second CG configuration on the first BWP to be in the not pending status. The MAC CE includes an LBT failure status indicator bit of a serving cell in which the terminal is located.

The sending of the media access control control element MAC CE to the network device may mean that the terminal successfully sends the MAC CE. Specifically, if the terminal receives an LBT success indication that is from a physical layer (PHY) and that is related to the MAC CE, it indicates that the MAC CE can be successfully sent, and it is considered that the MAC CE is successfully sent. In addition, from a perspective of only a MAC layer, regardless of an LBT failure or success related to the MAC CE, it is considered that sending of the MAC CE is successful when the MAC layer triggers the sending, in other words, it is considered that the MAC CE is successfully sent.

In some embodiments, the serving cell in which the terminal is located may include a primary cell, a primary secondary cell, and a secondary cell. If the terminal determines that the N consecutive uplink LBT failures occur on the first BWP, when the terminal actively switches from the first BWP to the second BWP in a case in which the terminal is located in the primary cell or the primary secondary cell, the terminal clears the buffers of all the HARQ processes that are associated with the second CG configuration on the first BWP, or sets all the HARQ processes that are associated with the second CG configuration on the first BWP to be in the not pending status. The second BWP is a BWP that is configured with a physical random access channel PRACH resource and on which the N consecutive uplink LBT failures do not occur, and the second BWP and the first BWP belong to a same serving cell.

In some embodiments, if determining that the N consecutive uplink LBT failures occur on the first BWP, the terminal receives a BWP switching instruction from the network device when the terminal is located in any type of cell (namely, the primary cell, the primary secondary cell, or the secondary cell) in the serving cell. In response to the BWP switching instruction, the terminal clears the buffers of all the HARQ processes that are associated with the second CG configuration on the first BWP, or sets all the HARQ processes that are associated with the second CG configuration on the first BWP to be in the not pending status. The BWP switching instruction indicates the terminal to switch from the first BWP to a third BWP. The BWP switching instruction may be RRC signaling, or may be DCI. The third BWP may be the same as the second BWP, or may be different from the second BWP.

It should be noted that, the terminal may "clear the buffers of all the HARQ processes that are associated with the second CG configuration on the first BWP, or set all the HARQ processes that are associated with the second CG configuration on the first BWP to be in the not pending status" on the foregoing second occasion (that is, when sending the MAC CE to the network device, when actively switching from the first BWP to the second BWP, or when responding to the BWP switching instruction). Alternatively, the terminal may "clear the buffers of all the HARQ processes that are associated with the second CG configuration on the first BWP, or set all the HARQ processes that are associated with the second CG configuration on the first BWP to be in the not pending status" on an occasion other than the second occasion. This is not limited in this embodiment of this application.

To more accurately control duration during which a HARQ process is occupied in a transmission process of one piece of uplink data, after setting the one or more HARQ processes that are associated with the first CG to be in the not pending status (for example, after step S401, step S501, or step S601), when sending the uplink data to the network device, the terminal records total duration during which the HARQ process that is used in the transmission process of the one piece of uplink data is in the pending status, or a quantity of times that the HARQ process that is used in the transmission process enters the pending status. The total duration or the quantity of times of entering the pending status is used to more accurately control the duration during which the HARQ process is occupied in the transmission process of the one piece of uplink data.

Figure 9:
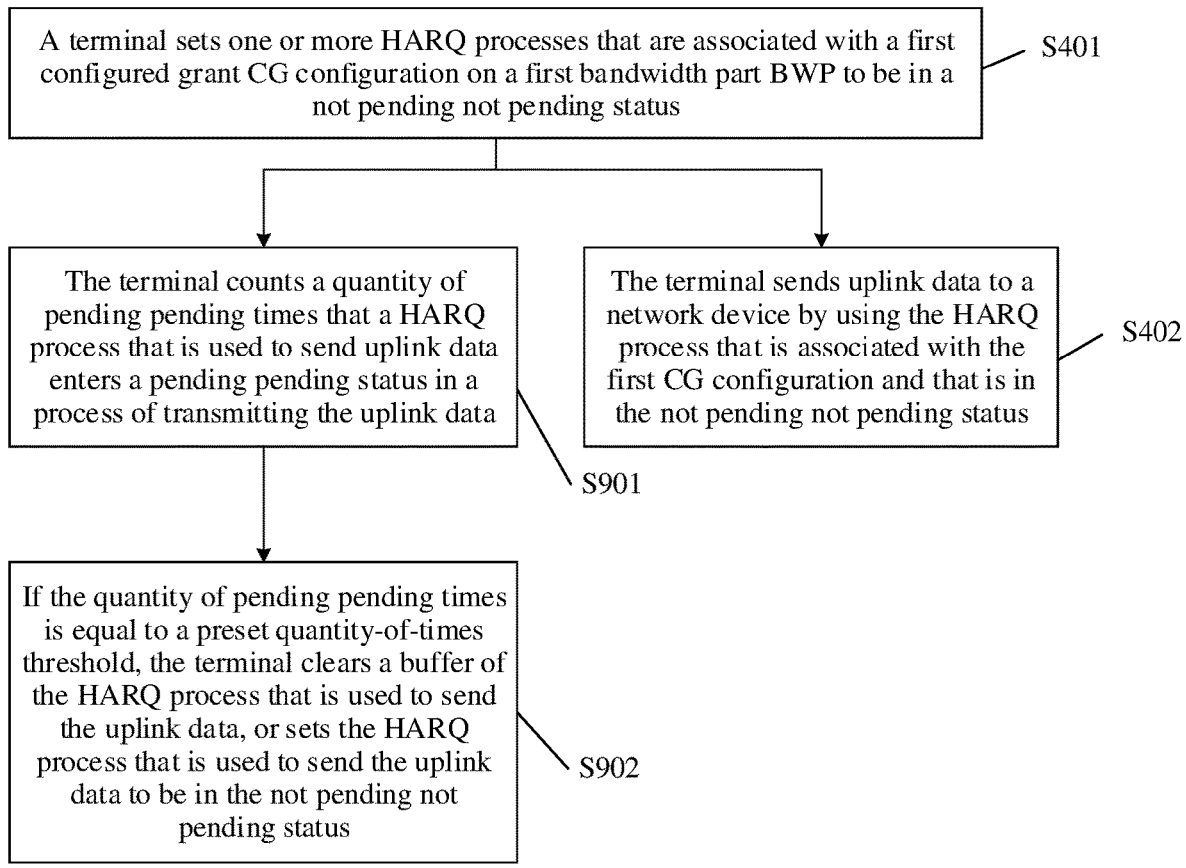
FIG. 9 is a flowchart 6 of a HARQ process-based data transmission method according to an embodiment of this application.

The terminal may record the quantity of times that the HARQ process that is used in the transmission process of the one piece of uplink data enters the pending status, to more accurately control the duration during which the HARQ process is occupied in the transmission process of the one piece of uplink data. Steps S401 and S402 are used as an example. As shown in FIG. 9, the HARQ process-based data transmission method provided in this embodiment of this application may include steps S901 and S902 after step S401.

Step S901. The terminal counts a quantity of pending times that a HARQ process that is used to send uplink data enters the pending status in a process of transmitting the uplink data.

The quantity of pending times includes a quantity of times that the HARQ process that is used to send the uplink data enters the pending status during new transmission and retransmission.

The terminal may define a pending counter, and the pending counter is used to record the quantity of pending times. An initial value of the quantity of pending times recorded by the pending counter is 0. A preset quantity-of-times threshold corresponding to the pending counter may be configured by a network device or preset in a protocol. The preset quantity-of-times threshold may be carried in configuration information of a CG configuration, and preset quantity-of-times thresholds in configuration information of different CG configurations may be the same or may be different. The pending counter may be maintained in each HARQ process, that is, a quantity of times that each HARQ process enters the pending status is recorded.

Further, each time the new transmission or the retransmission is performed in the transmission process of the one piece of uplink data, the terminal determines whether the HARQ process that is used to send the uplink data is in the pending status. If the HARQ process is in the pending status, the pending counter increases by 1 (that is, the quantity of pending times is increased by 1). If the HARQ process is not in the pending status, the pending counter does not increase by 1 (that is, the quantity of pending times is not increased by 1). The terminal further determines whether the quantity of pending times recorded by the pending counter is equal to the preset quantity-of-times threshold. If the quantity of pending times is equal to the preset quantity-of-times threshold, step S902 is performed. If the quantity of pending times is less than the preset quantity-of-times threshold, the quantity of pending times continues to be counted.

Step S902. If the quantity of pending times is equal to the preset quantity-of-times threshold, the terminal clears a buffer of the HARQ process that is used to send the uplink data, or sets the HARQ process that is used to send the uplink data to be in the not pending status.

After the buffer of the HARQ process that is used to send the uplink data is cleared, the HARQ process that is used to send the uplink data is in the not pending status.

It should be noted that steps S901 and S902 and step S402 in FIG. 9 are parallel, and step S901 may be performed when step S402 starts to be performed.

In this embodiment of this application, the quantity of pending times that the HARQ process that is used in the transmission process of the one piece of uplink data enters the pending status is counted. The quantity of pending times includes not only a quantity of times that the HARQ process enters the pending status due to an uplink LBT failure after a CGRT and a CGT are started, but also a quantity of times that the HARQ process enters the pending status because a plurality of consecutive uplink LBT failures occur before the CGRT and the CGT are started in uplink transmission. In other words, the quantity of pending times more accurately records a quantity of times that the HARQ process enters the pending status in the uplink transmission. Then, it is determined that the quantity of pending times is equal to the preset quantity-of-times threshold, and the buffer of the HARQ process is cleared or the HARQ process is set to be in the not pending status. The duration during which the HARQ process is occupied in the transmission process of the one piece of uplink data is more accurately controlled by counting the quantity of pending times, to avoid a case in which the HARQ process is occupied for a long time in the transmission process of the one piece of uplink data because the plurality of consecutive uplink LBT failures occur before the CGT and the CGRT are started.

Figure 10:
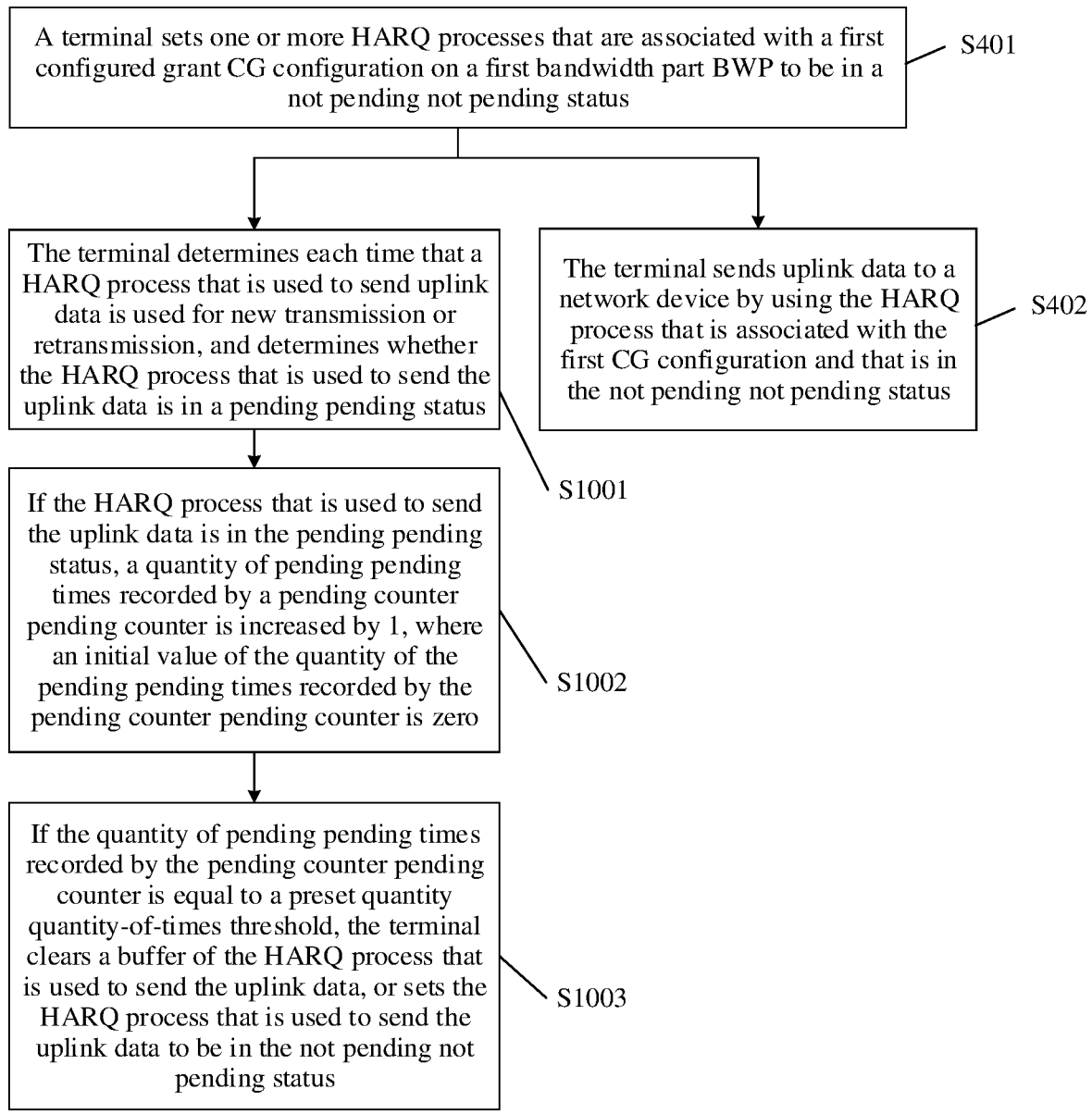
FIG. 10 is a flowchart 7 of a HARQ process-based data transmission method according to an embodiment of this application.

For example, the terminal may record the quantity of times that the HARQ process that is used in the transmission process of the one piece of uplink data enters the pending status, to resolve a problem that the HARQ process is occupied for a long time in the transmission process of the one piece of uplink data because the plurality of consecutive uplink LBT failures occur before the CGT and the CGRT are started. Steps S401 and S402 are used as an example. As shown in FIG. 10, the HARQ process-based data transmission method provided in this embodiment of this application may further include steps S1001 to S1003 after step S401.

Step S1001. The terminal determines each time that a HARQ process that is used to send uplink data is used for new transmission or retransmission, and determines whether the HARQ process that is used to send the uplink data is in the pending status.

In the transmission process of the one piece of uplink data, each time the new transmission or the retransmission starts, the terminal determines whether the HARQ process that is used to send the uplink data is in the pending status. If the HARQ process is in the pending status, the pending counter increases by 1 (that is, step S1002 is performed). If the HARQ process is not in the pending status, the pending counter does not increase by 1 (that is, the quantity of pending times recorded by the pending counter remains unchanged).

When the terminal determines that the HARQ process is in the pending status, if a pending counter does not start counting (that is, the pending counter is not started), the pending counter starts counting (that is, the pending counter is started), and the pending counter increases by 1; or if the pending counter is already performing counting, the pending counter directly increases by 1 (that is, the quantity of pending times is increased by 1). When the terminal determines that the HARQ process is not in the pending status, if the pending counter does not start counting, the pending counter does not need to start counting or is not started, and the pending counter does not increase by 1, or if the pending counter is already performing counting, the pending counter is reset (that is, the quantity of pending times recorded by the pending counter is set to 0), and the pending counter does not increase by 1.

Step S1002. If the HARQ process that is used to send the uplink data is in the pending status, the quantity of pending times recorded by the pending counter is increased by 1, where an initial value of the quantity of pending times recorded by the pending counter is zero.

After the quantity of pending times is increased by 1, the terminal further determines whether the quantity of pending times is equal to a preset quantity-of-times threshold. If the quantity of pending times is equal to the preset quantity-of-times threshold, step S1003 is performed; or if the quantity of pending times is less than the preset quantity-of-times threshold, step S1001 continues to be performed.

Step S1003. If the quantity of pending times recorded by the pending counter is equal to the preset quantity-of-times threshold, the terminal clears a buffer of the HARQ process that is used to send the uplink data, or sets the HARQ process that is used to send the uplink data to be in the not pending status.

After the buffer of the HARQ process that is used to send the uplink data is cleared, the HARQ process that is used to send the uplink data is in the not pending status.

It should be noted that steps S1001 to S1003 and step S402 in FIG. 10 are parallel, and step S1001 may be performed when step S402 starts to be performed.

In this embodiment of this application, the quantity of pending times that the HARQ process that is used in the transmission process of the one piece of uplink data continuously enters the pending status is counted. That the HARQ process continuously enters the pending status means that after an uplink LBT failure occurs in one new transmission or one retransmission of the HARQ process, the uplink LBT failure still occurs in a next retransmission. The quantity of pending times may include a quantity of times that the HARQ process enters the pending status because a plurality of consecutive uplink LBT failures occur before a CGRT and a CGT are started in uplink transmission.

Then, it is determined that the quantity of pending times is equal to the preset quantity-of-times threshold, and the buffer of the HARQ process is cleared or the HARQ process is set to be in the not pending status. Based on the quantity of pending times, a case in which the HARQ process is occupied for a long time in the transmission process of the one piece of uplink data because the plurality of consecutive uplink LBT failures occur before the CGT and the CGRT are started is avoided.

Figure 11:
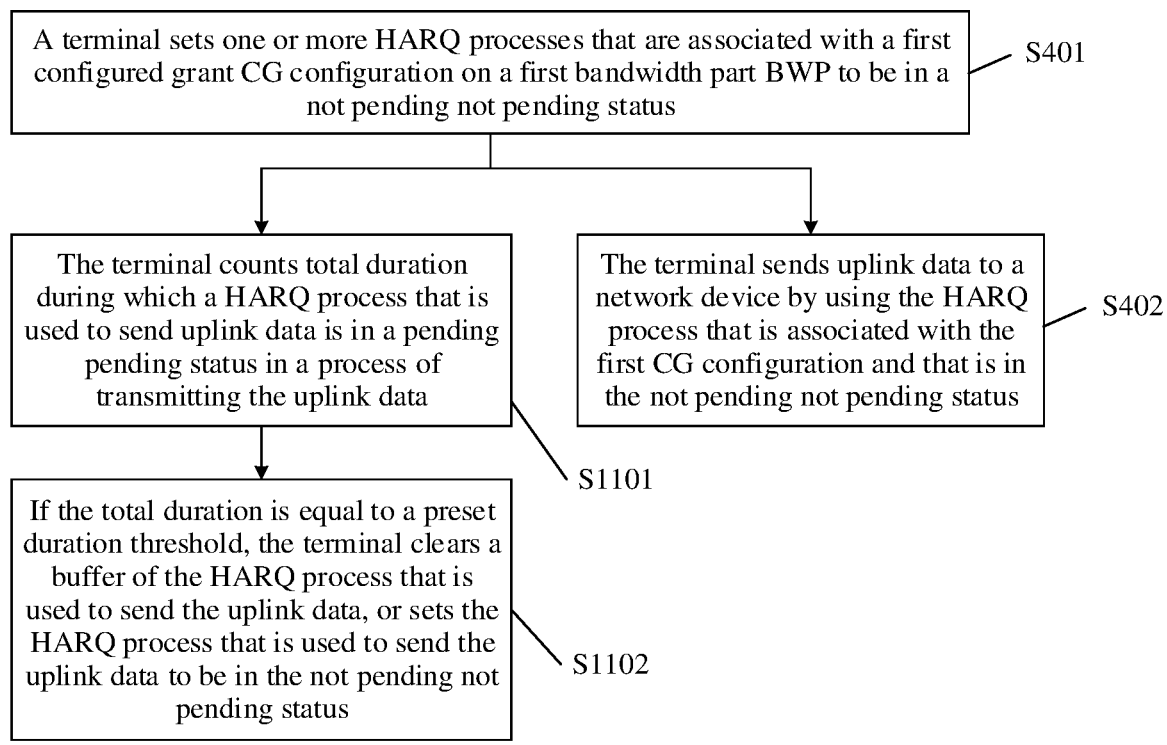
FIG. 11 is a flowchart 8 of a HARQ process-based data transmission method according to an embodiment of this application.

The terminal may further record total duration during which the HARQ process that is used in the transmission process of the one piece of uplink data is in the pending status, to more accurately control the duration during which the HARQ process is occupied in the transmission process of the one piece of uplink data. Steps S401 and S402 are used as an example. As shown in FIG. 11, the HARQ process-based data transmission method provided in this embodiment of this application may include steps S1101 and S1102 after step S401.

Step S1101. The terminal counts total duration during which a HARQ process that is used to send uplink data is in the pending status in a process of transmitting the uplink data.

The terminal may define a pending timer, and the pending timer is used to record the total duration. A preset duration threshold corresponding to the pending timer may be configured by the network device or preset in a protocol. The preset duration threshold may be carried in configuration information of a CG configuration, and preset duration thresholds in configuration information of different CG configurations may be the same or may be different. The pending timer may be maintained in each HARQ process, that is, total duration during which each HARQ process is in the pending status is recorded.

Further, the terminal determines, in the transmission process of the one piece of uplink data, whether a HARQ process that is used for current uplink transmission is in the pending status. If the HARQ process is in the pending status, the terminal starts the pending timer. If the HARQ process is not in the pending status, the terminal stops the pending timer. During timing of the pending timer, the terminal further determines whether the total duration that is recorded by the pending timer and during which the HARQ process is in the pending status is equal to the preset duration threshold. If the total duration is equal to the preset duration threshold, step S1102 is performed. If the total duration is not equal to the preset duration threshold, the total duration continues to be counted.

Specifically, the terminal determines, for each new transmission or retransmission in the transmission process of the one piece of uplink data, whether the HARQ process that is used to send the uplink data is in the pending status. If the HARQ process is in the pending status and the pending timer does not start timing (that is, the pending timer is not started), the terminal starts the pending timer. If the HARQ process is in the pending status and the pending timer is already performing timing, the pending timer continues timing. If the HARQ process is not in the pending status and the pending timer does not start timing (that is, the pending timer is not started), the pending timer is not started (that is, the pending timer is not used for timing). If the HARQ process is not in the pending status and the pending timer is already performing timing, the pending timer is stopped (that is, the pending timer stops timing).

Step S1102. If the total duration is equal to the preset duration threshold, the terminal clears a buffer of the HARQ process that is used to send the uplink data, or sets the HARQ process that is used to send the uplink data to be in the not pending status.

After the buffer of the HARQ process that is used to send the uplink data is cleared, the HARQ process that is used to send the uplink data is in the not pending status.

It should be noted that steps S1101 and S1102 and step S402 in FIG. 11 are parallel, and step S1101 may be performed when step S402 starts to be performed.

In this embodiment of this application, the total duration during which the HARQ process that is used in the transmission process of the one piece of uplink data is in the pending status is counted. The total duration includes not only duration during which the HARQ process is in the pending status due to an uplink LBT failure after a CGRT and a CGT are started, but also duration during which the HARQ process is in the pending status because a plurality of consecutive uplink LBT failures occur before the CGRT and the CGT are started in uplink transmission. In other words, the total duration more accurately records duration during which the HARQ process is in the pending status in the uplink transmission. Then, it is determined that the total duration is equal to the preset duration threshold, and the buffer of the HARQ process is cleared or the HARQ process is set to be in the not pending status. The duration during which the HARQ process is occupied in the transmission process of the one piece of uplink data is more accurately controlled by counting the total duration, to avoid a case in which the HARQ process is occupied for a long time in the transmission process of the one piece of uplink data because the plurality of consecutive uplink LBT failures occur before the CGT and the CGRT are started.

Figure 12:
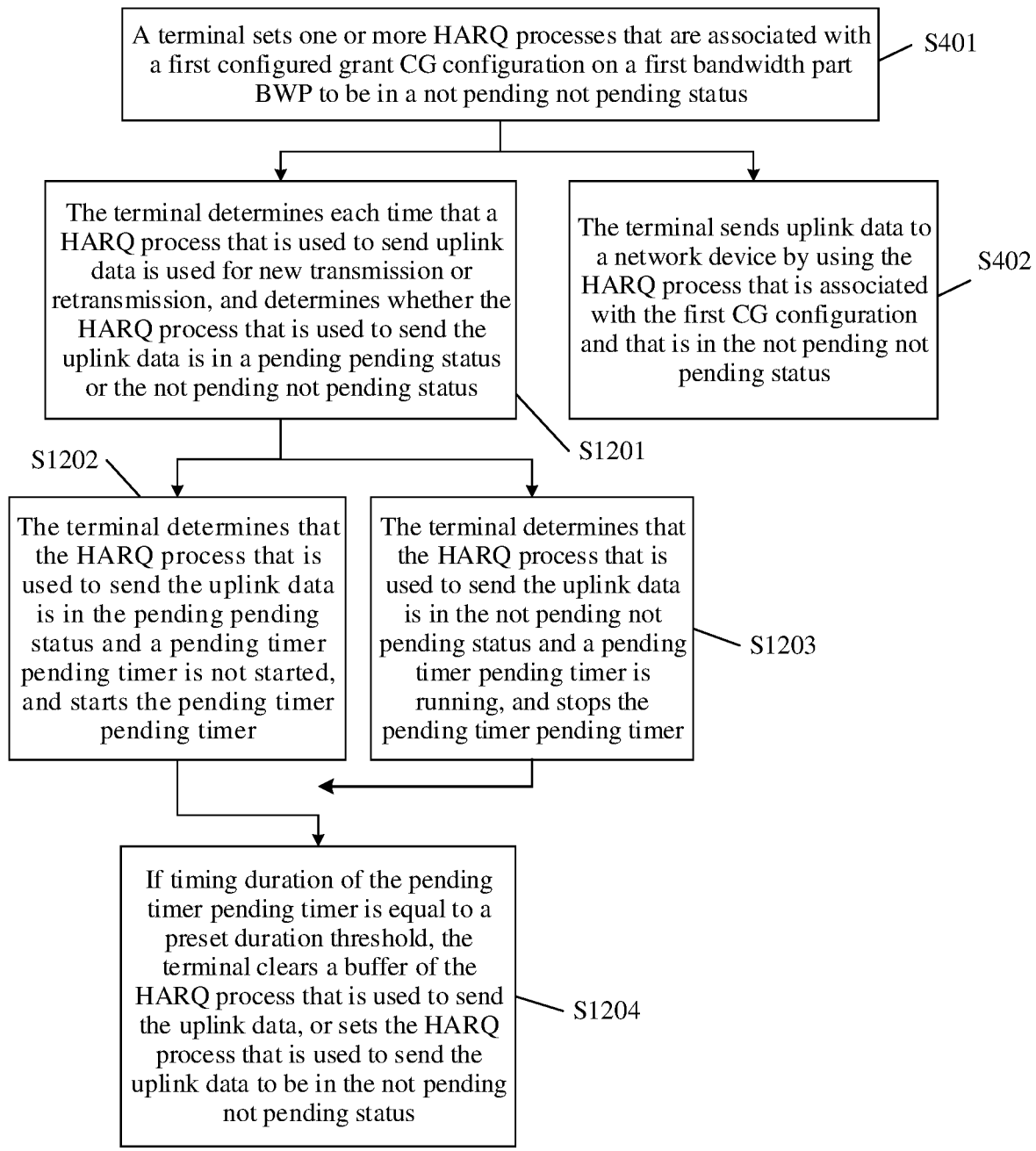
FIG. 12 is a flowchart 9 of a HARQ process-based data transmission method according to an embodiment of this application.

For example, the terminal may further record the total duration during which the HARQ process that is used in the transmission process of the one piece of uplink data is in the pending status, to resolve a problem that the HARQ process is occupied for a long time in the transmission process of the one piece of uplink data because the plurality of consecutive uplink LBT failures occur before the CGT and the CGRT are started. Steps S401 and S402 are used as an example. As shown in FIG. 12, the HARQ process-based data transmission method provided in this embodiment of this application may further include steps S1201 to S1204 after step S401.

Step S1201. The terminal determines each time that a HARQ process that is used to send uplink data is used for new transmission or retransmission, and determines whether the HARQ process that is used to send the uplink data is in the pending status or the not pending status.

In a transmission process of one piece of uplink data, each time new transmission or retransmission starts, the terminal may determine whether the HARQ process that is used to send the uplink data is in the pending status or the not pending status. If the HARQ process is in the pending status, when a pending timer is not started, step S1202 is performed; or when the pending timer is running (that is, timing is performed), the pending timer continues to run (that is, the timing continues). If the HARQ process is in the not pending status, when the pending timer is not started, the pending timer is not started; or when the pending timer is running, step S1203 is performed.

Step S1202. The terminal determines that the HARQ process that is used to send the uplink data is in the pending status and the pending timer is not started, and starts the pending timer.

The pending timer is used to count total duration in which the HARQ process that is used to send the uplink data is in the pending status in the process of transmitting the uplink data.

In the transmission process of the one piece of uplink data, when the pending timer is running (that is, timing is performed), the terminal further determines whether timing duration (namely, the total duration during which the HARQ process is in the pending status) recorded by the pending timer is equal to a preset duration threshold. If the timing duration is equal to the preset duration threshold, step S1204 is performed. If the timing duration is not equal to the preset duration threshold, step S1201 continues to be performed.

Step S1203. The terminal determines that the HARQ process that is used to send the uplink data is in the not pending status and the pending timer is running, and stops the pending timer.

In the transmission process of the one piece of uplink data, when the pending timer is running (that is, timing is performed), the terminal further determines whether the timing duration (namely, the total duration during which the HARQ process is in the pending status) recorded by the pending timer is equal to the preset duration threshold. If the timing duration is equal to the preset duration threshold, step S1204 is performed. If the timing duration is not equal to the preset duration threshold, step S1201 continues to be performed.

Step S1204. If the timing duration of the pending timer is equal to the preset duration threshold, the terminal clears a buffer of the HARQ process that is used to send the uplink data, or sets the HARQ process that is used to send the uplink data to be in the not pending status.

After the buffer of the HARQ process that is used to send the uplink data is cleared, the HARQ process that is used to send the uplink data is in the not pending status.

In this embodiment of this application, the total duration during which the HARQ process that is used in the transmission process of the one piece of uplink data is continuously in the pending status is counted. That the HARQ process is continuously in the pending status means that after an uplink LBT failure occurs in one new transmission or one retransmission of the HARQ process and the HARQ process is in the pending status, the uplink LBT failure still occurs in a next retransmission and the HARQ process is in the pending status. The total duration may include duration during which the HARQ process is in the pending status because a plurality of consecutive uplink LBT failures occur before a CGRT and a CGT are started in uplink transmission. Then, it is determined that the total duration is equal to the preset duration threshold, and the buffer of the HARQ process is cleared or the HARQ process is set to be in the not pending status. Based on the total duration, a case in which the HARQ process is occupied for a long time in the transmission process of the one piece of uplink data because the plurality of consecutive uplink LBT failures occur before the CGT and the CGRT are started is avoided.

It may be understood that, to implement the foregoing functions, the terminal includes a corresponding hardware structure and/or software module for executing the functions. A person skilled in the art should easily be aware that, in combination with the example units and algorithm steps described in the embodiments disclosed in this specification, embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 13:
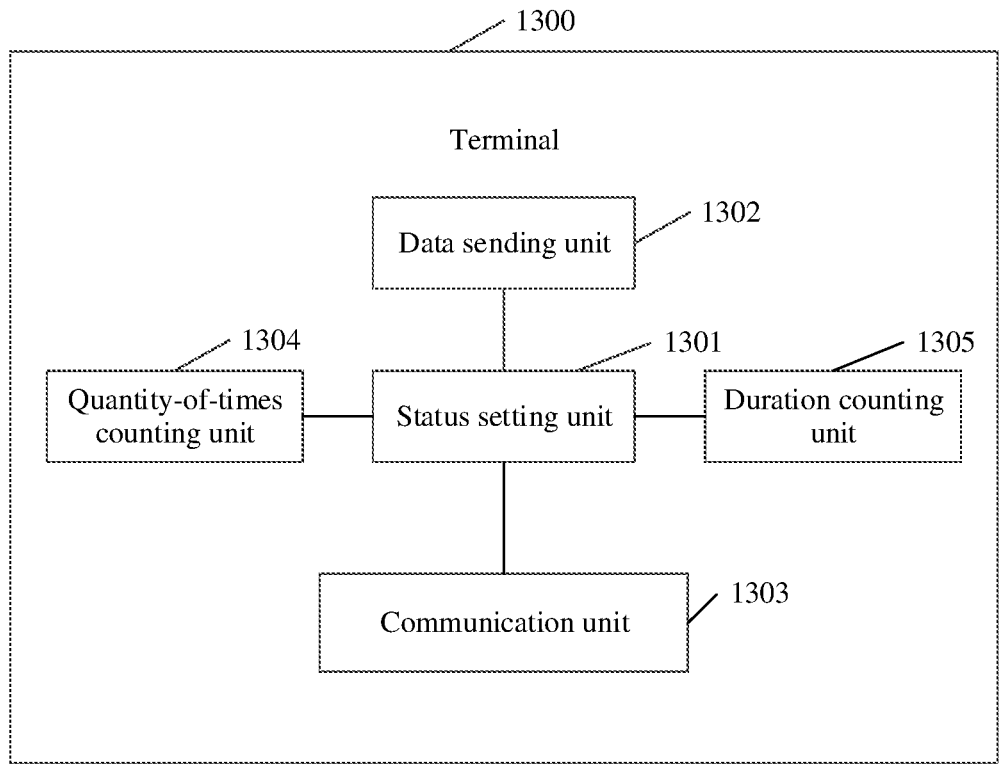
FIG. 13 is a schematic composition diagram 1 of a structure of a terminal according to an embodiment of this application.

When each function module is obtained through the division based on each corresponding function, as shown in FIG. 13, an embodiment of this application provides a terminal 1300. The terminal 1300 includes a status setting unit 1301 and a data sending unit 1302.

The status setting unit 1301 is configured to support the terminal 1300 in performing S401, S501, S601, S703, S902, S1003, S1102 and S1204 in the foregoing method embodiments and/or another process of the technology described in this specification. The data sending unit 1302 is configured to support the terminal 1300 in performing S402, S502, and S602 in the foregoing method embodiments and/or another process of the technology described in this specification.

Further, the terminal 1300 may further include a communication unit 1303. The communication unit 1303 is configured to support the terminal 1300 in performing "receiving a BWP switching instruction from a network device" in the foregoing method embodiments and/or another process of the technology described in this specification.

Further, the terminal 1300 may further include a quantity-of-times counting unit 1304. The quantity-of-times counting unit 1304 is configured to support the terminal 1300 in performing S901, and S1001 and S1002 in the foregoing method embodiments and/or another process of the technology described in this specification.

Further, the terminal 1300 may further include a duration counting unit 1305. The duration counting unit 1305 is configured to support the terminal 1300 in performing S1001 and S1201 to S1203 in the foregoing method embodiments and/or another process of the technology described in this specification.

Certainly, the terminal 1300 includes but is not limited to the unit modules listed above. For example, the terminal 1300 may further include a storage unit that is configured to store a not pending status of a HARQ process. In addition, specific functions that can be implemented by the foregoing function units include but are not limited to functions corresponding to the method steps in the foregoing instances. For detailed description of another unit of the terminal 1300, refer to the detailed descriptions of the method steps corresponding to the unit. Details are not described herein again in this embodiment of this application.

When an integrated unit is used, the status setting unit 1301, the communication unit 1303, the quantity-of-times counting unit 1304, the duration counting unit 1305, and the like may be integrated into one processing module for implementation. The data sending unit 1302 and the communication unit 1303 may be a communication circuit of the terminal, and the storage unit may be a storage module of the terminal.

Figure 14:
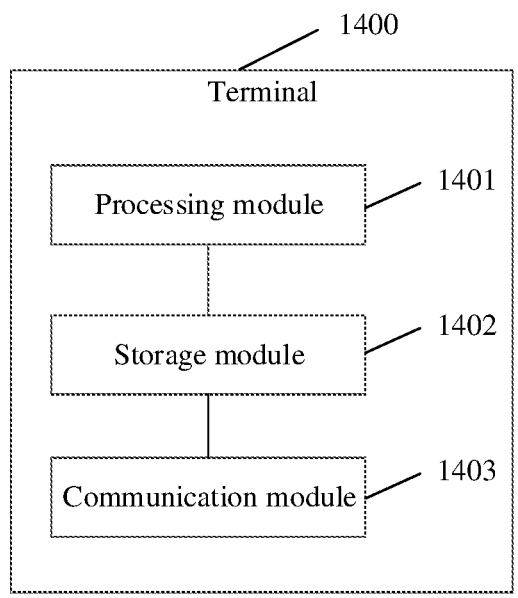
FIG. 14 is a schematic composition diagram 2 of a structure of a terminal according to an embodiment of this application.

FIG. 14 is a possible schematic diagram of a structure of a terminal related to the foregoing embodiment. A terminal 1400 includes a processing module 1401, a storage module 1402, and a communication module 1403.

The processing module 1401 is configured to control and manage the terminal 1400. The storage module 1402 is configured to store program code and data of the terminal 1400. The communication module 1403 is configured to communicate with another device. For example, the communication module is configured to receive data sent by the another device or send data to the another device.

The processing module 1401 may be a processor or a controller, for example, a CPU, a general-purpose processor, a digital signal processor (DSP), an application-specific integrated circuit (ASIC), a field programmable gate array (FPGA) or another programmable logic device, a transistor logic device, a hardware component, or any combination thereof. The processing module 1401 may implement or execute various example logical blocks, modules, and circuits described with reference to content disclosed in this application. The processor may be a combination of processors implementing a computing function, for example, a combination of one or more microprocessors, or a combination of the DSP and a microprocessor. The communication module 1403 may be a transceiver, a transceiver circuit, a communication interface, or the like. The storage module 1402 may be a memory.

When the processing module 1401 is a processor (the processor 21 and the processor 25 shown in FIG. 2), the communication module 1403 is a communication circuit (the communication interface 23 shown in FIG. 2), and the storage module 1402 is a memory (the memory 22 shown in FIG. 2), the terminal provided in this application may be the terminal shown in FIG. 2. The processor, the communication interface, and the memory may be coupled together through a bus.

An embodiment of this application further provides a computer storage medium. The computer storage medium stores computer program code, and when the foregoing processor executes the computer program code, the terminal performs related method steps in any accompanying drawing of FIG. 4 to FIG. 12 to implement the method in the foregoing embodiments.

An embodiment of this application further provides a computer program product. When the computer program product runs on a terminal, the terminal is enabled to perform related method steps in any accompanying drawing of FIG. 4 to FIG. 12 to implement the method in the foregoing embodiments.

The terminal 1300, the terminal 1400, the computer storage medium, and the computer program product provided in this application are all configured to perform the corresponding methods provided above. Therefore, for beneficial effects that the terminal 1300, the terminal 1400, the computer storage medium, and the computer program product can achieve, refer to beneficial effects in the corresponding methods provided above. Details are not described again herein.

Based on the foregoing descriptions of the implementations, a person skilled in the art may clearly understand that for the purpose of convenient and brief description, division of the foregoing functional modules is taken as an example for illustration. In actual application, the foregoing functions can be allocated to different functional modules for implementation based on a requirement. That is, an inner structure of an apparatus is divided into different functional modules to implement all or a part of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the modules or units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may or may not be physical units, may be located in one place, or may be distributed on a plurality of network units. A part or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) or a processor to perform all or a part of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a terminal, the method comprising:
in response to receiving a downlink control information (DCI) activation command from a network device, setting a status of one or more hybrid automatic repeat request (HARQ) processes that are associated with a first configured grant (CG) configuration to a not pending status, wherein the DCI activation command indicates to the terminal to activate the first CG configuration, the first CG configuration comprises one or more CG configurations configured by the network device for the terminal on a first bandwidth part (BWP), and the first BWP is a currently activated BWP of the terminal; and sending uplink data to the network device using a HARQ process of the one or more HARQ processes that is associated with the first CG configuration and that is in the not pending status.

2. The method according to claim 1, wherein the one or more HARQ processes that are associated with the first CG configuration comprise:

all HARQ processes that are associated with the first CG configuration;

a HARQ process that is one of HARQ processes that are associated with the first CG configuration and that is in a pending status;

a first HARQ process that is one of the HARQ processes associated with the first CG configuration and that is not used by the terminal, the first HARQ process being unassociated with an uplink grant that is currently delivered to a HARQ entity;

a HARQ process that is one of the HARQ processes associated with the first CG configuration and that is not being used; or a corresponding HARQ process that is one of the HARQ processes associated with the first CG configuration and that is randomly selected by the terminal.

3. The method according to claim 1, wherein the method further comprises:

when N consecutive uplink listen before talk (LBT) failures have occurred on the first BWP, clearing buffers of all HARQ processes that are associated with a second CG configuration on the first BWP, or determining that all the HARQ processes that are associated with the second CG configuration on the first BWP are in the not pending status, wherein:

N≥2, and N is an integer;

the second CG configuration comprises all CG configurations configured by the network device for the terminal on the first BWP or an activated CG configuration configured for the terminal on the first BWP; and after the buffers of all the HARQ processes that are associated with the second CG configuration are cleared, all the HARQ processes that are associated with the second CG configuration are in the not pending status.

4. The method according to claim 3, wherein clearing the buffers of all the HARQ processes that are associated with the second CG configuration on the first BWP, or determining that all the HARQ processes that are associated with the second CG configuration on the first BWP are in the not pending status comprises:

when sending a media access control control element (MAC CE) to the network device, clearing the buffers of all the HARQ processes that are associated with the second CG configuration, or determining that all the HARQ processes that are associated with the second CG configuration are in the not pending status, wherein the MAC CE comprises an LBT failure status indicator bit of a serving cell in which the terminal is located.

5. The method according to claim 3, wherein clearing the buffers of all the HARQ processes that are associated with the second CG configuration on the first BWP, or determining that all the HARQ processes that are associated with the second CG configuration on the first BWP are in the not pending status comprises:

when the terminal is located in a primary cell or a primary secondary cell, and the terminal actively switches from the first BWP to a second BWP, clearing the buffers of all the HARQ processes that are associated with the second CG configuration, or determining that all the HARQ processes that are associated with the second CG configuration are in the not pending status, wherein:

the second BWP is a BWP that is configured with a physical random access channel (PRACH) resource and on which the N consecutive uplink LBT failures do not occur, and the second BWP and the first BWP belong to a same serving cell.

6. A method applied to a terminal, the method comprising:

in response to receiving radio resource control (RRC) signaling from a network device, setting one or more hybrid automatic repeat request (HARQ) processes that are associated with a first configured grant (CG) configuration to be in a not pending status, wherein the RRC signaling configures and activates the first CG configuration for the terminal, the first CG configuration comprises one or more CG configurations configured by the network device for the terminal on a first bandwidth part (BWP), and the first BWP is a currently activated BWP of the terminal; and sending uplink data to the network device using a HARQ process, of the one or more HARQ processes, that is associated with the first CG configuration and that is in the not pending status.

7. The method according to claim 6, wherein the one or more HARQ processes that are associated with the first CG configuration comprise:

all HARQ processes that are associated with the first CG configuration;

a HARQ process that is one of HARQ processes that are associated with the first CG configuration and that is in a pending status;

a first HARQ process that is one of the HARQ processes associated with the first CG configuration and that is not used by the terminal, the first HARQ process being unassociated with an uplink grant that is currently delivered to a HARQ entity;

a HARQ process that is one of the HARQ processes associated with the first CG configuration and that is not being used; or a corresponding HARQ process that is one of the HARQ processes associated with the first CG configuration and that is randomly selected by the terminal.

8. The method according to claim 6, wherein the method further comprises:

when N consecutive uplink listen before talk (LBT) failures have occurred on the first BWP, clearing buffers of all HARQ processes that are associated with a second CG configuration on the first BWP, or determining that all the HARQ processes that are associated with the second CG configuration on the first BWP are in the not pending status, wherein:

N≥2, and N is an integer;

the second CG configuration comprises all CG configurations configured by the network device for the terminal on the first BWP or an activated CG configuration configured for the terminal on the first BWP; and after the buffers of all the HARQ processes that are associated with the second CG configuration are cleared, all the HARQ processes that are associated with the second CG configuration are in the not pending status.

9. The method according to claim 8, wherein clearing the buffers of all the HARQ processes that are associated with the second CG configuration on the first BWP, or determining that all the HARQ processes that are associated with the second CG configuration on the first BWP are in the not pending status comprises:
when sending a media access control control element (MAC CE) to the network device, clearing the buffers of all the HARQ processes that are associated with the second CG configuration, or determining that all the HARQ processes that are associated with the second CG configuration are in the not pending status, wherein the MAC CE comprises an LBT failure status indicator bit of a serving cell in which the terminal is located.

10. The method according to claim 8, wherein clearing the buffers of all the HARQ processes that are associated with the second CG configuration on the first BWP, or determining that all the HARQ processes that are associated with the second CG configuration on the first BWP are in the not pending status comprises:
when the terminal is located in a primary cell or a primary secondary cell, and the terminal actively switches from the first BWP to a second BWP, clearing the buffers of all the HARQ processes that are associated with the second CG configuration, or determining that all the HARQ processes that are associated with the second CG configuration are in the not pending status, wherein the second BWP is a BWP that is configured with a physical random access channel (PRACH) resource and on which the N consecutive uplink LBT failures do not occur, and the second BWP and the first BWP belong to a same serving cell.

11. An apparatus comprising:
at least one processor; and
a non-transitory memory coupled to the at least one processor and configured to store executable instructions for execution by the at least one processor to instruct the at least one processor to:
in response to receiving a downlink control information (DCI) activation command from a network device, set one or more hybrid automatic repeat request (HARQ) processes that are associated with a first configured grant (CG) configuration to be in a not pending status, wherein the DCI activation command indicates the apparatus to activate the first CG configuration, the first CG configuration comprises one or more CG configurations configured by the network device for the apparatus on a first bandwidth part (BWP), and the first BWP is a currently activated BWP of the apparatus; and
send uplink data to the network device by using a HARQ process of the one or more HARQ processes that is associated with the first CG configuration and that is in the not pending status.

12. The apparatus according to claim 11, wherein the one or more HARQ processes that are associated with the first CG configuration comprise:
all HARQ processes that are associated with the first CG configuration;
a HARQ process that is one of HARQ processes that are associated with the first CG configuration and that is in a pending status;
a first HARQ process that is one of the HARQ processes associated with the first CG configuration and that is not used by the apparatus, the first HARQ process being unassociated with an uplink grant that is currently delivered to a HARQ entity;
a HARQ process that is one of the HARQ processes associated with the first CG configuration and that is not being used; or
a corresponding HARQ process that is one of the HARQ processes associated with the first CG configuration and that is randomly selected by the apparatus.

13. The apparatus according to claim 11, wherein the executable instructions further instruct the at least one processor to:
when N consecutive uplink listen before talk (LBT) failures have occurred on the first BWP, clear buffers of all HARQ processes that are associated with a second CG configuration on the first BWP, or determine that all the HARQ processes that are associated with the second CG configuration on the first BWP are in the not pending status, wherein:
N≥2, and N is an integer;
the second CG configuration comprises all CG configurations configured by the network device for the apparatus on the first BWP or an activated CG configuration configured for the apparatus on the first BWP; and
after the buffers of all the HARQ processes that are associated with the second CG configuration are cleared, all the HARQ processes that are associated with the second CG configuration are in the not pending status.

14. The apparatus according to claim 13, wherein the executable instructions further instruct the at least one processor to:
when sending a media access control control element (MAC CE) to the network device, clear the buffers of all the HARQ processes that are associated with the second CG configuration, or determine that all the HARQ processes that are associated with the second CG configuration are in the not pending status, wherein the MAC CE comprises an LBT failure status indicator bit of a serving cell in which the apparatus is located.

15. The apparatus according to claim 13, wherein the executable instructions further instruct the at least one processor to:
when the apparatus is located in a primary cell or a primary secondary cell, and the apparatus actively switches from the first BWP to a second BWP, clear the buffers of all the HARQ processes that are associated with the second CG configuration, or determine that all the HARQ processes that are associated with the second CG configuration are in the not pending status, wherein
the second BWP is a BWP that is configured with a physical random access channel (PRACH) resource and on which the N consecutive uplink LBT failures do not occur, and the second BWP and the first BWP belong to a same serving cell.

16. An apparatus comprising:
at least one processor; and
a non-transitory memory coupled to the at least one processor, and configured to store executable instructions for execution by the at least one processor to instruct the at least one processor to:
in response to receiving radio resource control (RRC) signaling from a network device, setting one or more hybrid automatic repeat request (HARQ) processes that are associated with a first configured grant (CG) configuration to be in a not pending status, wherein the RRC signaling configures and activates the first CG configuration for the apparatus, the first CG configuration comprises one or more CG configurations configured by the network device for the apparatus on a first bandwidth part (BWP), and the first BWP is a currently activated BWP of the apparatus; and send uplink data to the network device using a HARQ process, of the one or more HARQ processes, that is associated with the first CG configuration and that is in the not pending status.

17. The apparatus according to claim 16, wherein the one or more HARQ processes that are associated with the first CG configuration comprise:
    all HARQ processes that are associated with the first CG configuration;
    a HARQ process that is one of HARQ processes that are associated with the first CG configuration and that is in a pending status;
    a first HARQ process that is one of the HARQ processes associated with the first CG configuration and that is not used by the apparatus, the first HARQ process being unassociated with an uplink grant that is currently delivered to a HARQ entity;
    a HARQ process that is one of the HARQ processes associated with the first CG configuration and that is not being used; or
    a corresponding HARQ process that is one of the HARQ processes associated with the first CG configuration and that is randomly selected by the apparatus.

18. The apparatus according to claim 17, wherein the executable instructions further instruct the at least one processor to:
    when N consecutive uplink listen before talk (LBT) failures have occurred on the first BWP, clear buffers of all HARQ processes that are associated with a second CG configuration on the first BWP, or determine that all the HARQ processes that are associated with the second CG configuration on the first BWP are in the not pending status, wherein:

N≥2, and N is an integer;
the second CG configuration comprises all CG configurations configured by the network device for the apparatus on the first BWP or an activated CG configuration configured for the apparatus on the first BWP; and
after the buffers of all the HARQ processes that are associated with the second CG configuration are cleared, all the HARQ processes that are associated with the second CG configuration are in the not pending status.

19. The apparatus according to claim 18, wherein the executable instructions further instruct the at least one processor to:
    when sending a media access control control element (MAC CE) to the network device, clear the buffers of all the HARQ processes that are associated with the second CG configuration, or determine that all the HARQ processes that are associated with the second CG configuration are in the not pending status, wherein the MAC CE comprises an LBT failure status indicator bit of a serving cell in which the apparatus is located.

20. The apparatus according to claim 18, wherein the executable instructions further instruct the at least one processor to:
    when the apparatus is located in a primary cell or a primary secondary cell, and the apparatus actively switches from the first BWP to a second BWP, clear the buffers of all the HARQ processes that are associated with the second CG configuration, or determine that all the HARQ processes that are associated with the second CG configuration are in the not pending status, wherein
    the second BWP is a BWP that is configured with a physical random access channel (PRACH) resource and on which the N consecutive uplink LBT failures do not occur, and the second BWP and the first BWP belong to a same serving cell.

* * * * *